US012777515B2

(12) United States Patent
Wu et al.

(10) Patent No.: US 12,777,515 B2
(45) Date of Patent: Oct. 27, 2026

(54) METHOD AND DEVICE FOR RESOURCE ELEMENT DETERMINATION IN WIRELESS COMMUNICATION

(71) Applicant: Apogee 5G Global, LLC, Plano, TX (US)

(72) Inventors: Lu Wu, Shanghai (CN); Xiaobo Zhang, Shanghai (CN)

(73) Assignee: Apogee 5G Global, LLC, Plano, TX (US)

(*) Notice: Subject to any disclaimer, the term of this patent is extended or adjusted under 35 U.S.C. 154(b) by 541 days.

(21) Appl. No.: 17/945,117

(22) Filed: Sep. 15, 2022

(65) Prior Publication Data

US 2023/0007663 A1 Jan. 5, 2023

Related U.S. Application Data

(63) Continuation of application No. PCT/CN2021/079659, filed on Mar. 9, 2021.

(30) Foreign Application Priority Data

Mar. 17, 2020 (CN) ......................... 202010186314.0
Mar. 26, 2020 (CN) ......................... 202010222505.8

(51) Int. Cl.
*H04W 72/56* (2023.01)
*H04L 5/00* (2006.01)
(Continued)

(52) U.S. Cl.
CPC ................................... *H04W 72/56* (2023.01)

(58) Field of Classification Search
CPC ..... H04L 1/0003; H04L 1/0009; H04L 1/001; H04L 1/0026; H04L 1/0041;
(Continued)

(56) References Cited

U.S. PATENT DOCUMENTS 11,375,483 B2 * 6/2022 Lin ....................... H04W 72/23
11,778,617 B2 * 10/2023 Yang ................. H04W 72/1268 370/329
(Continued)

FOREIGN PATENT DOCUMENTS

CN 109842929 A 6/2019
CN 110582095 A 12/2019
(Continued)

OTHER PUBLICATIONS

3GPP TS 38.212 V16.0.0; Technical Specification Group Radio Access Network; NR; Multiplexing and channel coding. Sec. 6.3. 2.4 Rate Matching (Dec. 2019) (Year: 2019).*
(Continued)

*Primary Examiner* — Moo Jeong
*Assistant Examiner* — Scott A Schlack
(74) *Attorney, Agent, or Firm* — Volpe Koenig

(57) ABSTRACT

Method and device in nodes used for wireless communication. A first node receives a first signaling, receives a second signaling, and transmits a first signal in a first radio resource block. The first signal comprises a second sub-signal; a value of a first field in the first signaling is used to indicate a first offset from a first offset set, a value of a first field in the second signaling is used to indicate a second offset from a second offset set, only the second offset is used to determine a number of Resource Element(s) (RE(s)) occupied by the second sub-signal in the first radio resource block; the first signaling is used to determine a first priority, the second signaling is used to determine a second priority, a signaling format of the first signaling is used to determine that the first offset set is related to the first priority.

20 Claims, 8 Drawing Sheets

(51) Int. Cl.
*H04L 1/00* (2006.01)
*H04W 72/23* (2023.01)

(58) Field of Classification Search
CPC ... H04L 1/0045; H04L 1/0061; H04L 1/1664; H04L 1/1812; H04L 5/0012; H04L 5/0044; H04L 5/0053; H04L 5/0055; H04L 5/0094; H04L 5/10; H04W 72/0413; H04W 72/0446; H04W 72/0466; H04W 72/10; H04W 72/1242; H04W 72/1773; H04W 72/21; H04W 72/23; H04W 72/56
See application file for complete search history.

(56) References Cited

U.S. PATENT DOCUMENTS

| | | | | |
|---|---|---|---|---|
| 11,943,774 | B2 * | 3/2024 | Wong | H04L 5/0053 |
| 11,968,676 | B2 * | 4/2024 | Li | H04L 1/007 |
| 2015/0223086 | A1 | 8/2015 | Kim | |
| 2019/0215823 | A1 * | 7/2019 | Kim | H04L 1/0031 |
| 2019/0394758 | A1 | 12/2019 | Cheng | |
| 2020/0036473 | A1 * | 1/2020 | Nemeth | H04L 1/203 |
| 2021/0068083 | A1 * | 3/2021 | Yang | H04W 72/21 |
| 2021/0377991 | A1 * | 12/2021 | Takeda | H04W 72/569 |
| 2025/0392424 | A1 * | 12/2025 | Wong | H04L 5/0048 |

FOREIGN PATENT DOCUMENTS

| | | | |
|---|---|---|---|
| WO | 2019095852 | A1 | 5/2019 |
| WO | 2019214468 | A1 | 11/2019 |

OTHER PUBLICATIONS

ISR received in application No. PCT/CN2021/079659 dated May 26, 2021.

First Search Report of Chinses patent application No. CN202010186314.0 dated Mar. 8, 2022.

First Search Report of Chinses patent application No. CN202010222505.8 dated Mar. 8, 2022.

Notification to Grant Patent Right for Invention of Chinses patent application No. CN202010186314.0 dated Mar. 15, 2022.

Notification to Grant Patent Right for Invention of Chinses patent application No. CN202010222505.8 dated Aug. 30, 2022.

First Office Action of Chinses patent application No. CN202010222505.8 dated Mar. 15, 2022.

Qualcomm Incorporated Multiplexing of PUCCH and PUSCH 3GPP TSG RAN WG1 Meeting 91 R1-1721387 Nov. 25, 2017.

MediaTek Inc PDCCH enhancements for eURLLC 3GPP TSG RAN WG1 Meeting #98 b R1-1911079 Oct. 8, 2019.

Huawei, HiSilicon UCI enhancements for URLLC 3GPP TSG RAN WG1 Meeting #96b R1-1903955 Apr. 3, 2019.

CMCC Discussion on UCI enhancements for URLLC 3GPP TSG RAN WG1 #98bis R1-1910167 Sep. 29, 2019.

OPPO PDCCH enhancement for URLLC 3GPP TSG RAN WG1 #100-E R1-2000479 Feb. 14, 2020.

Third Generation Partnership Project, "Technical Specification Group Radio Access Network; Evolved Universal Terrestrial Radio Access (E-UTRA); Multiplexing and channel coding (Release 16)," 3GPP TS 36.212 V16.0.0 (Dec. 2019).

Third Generation Partnership Project, "Technical Specification Group Radio Access Network; NR; Multiplexing and channel coding (Release 16)," 3GPP TS 38.212 V16.0.0 (Dec. 2019).

Third Generation Partnership Project, "Technical Specification Group Radio Access Network; NR; Physical layer procedures for control (Release 15)," 3GPP TS 38.213 V16.0.0 (Dec. 2019).

Third Generation Partnership Project, "Technical Specification Group Radio Access Network; NR; Physical layer procedures for data (Release 16)," 3GPP TS 38.214 V16.0.0 (Dec. 2019).

Third Generation Partnership Project, "Technical Specification Group Radio Access Network NR Radio Resource Control (RRC) protocol specification (Release 15)," 3GPP TS 38.331 V15.8.0 (Dec. 2019).

* cited by examiner

METHOD AND DEVICE FOR RESOURCE ELEMENT DETERMINATION IN WIRELESS COMMUNICATION

CROSS REFERENCE TO RELATED APPLICATIONS

This application is the continuation of the International Patent application No. PCT/CN2021/079659, filed on Mar. 9, 2021, which claims the priority benefit of Chinese Patent Application No. 202010186314.0, filed on Mar. 17, 2020, and claims the priority benefit of Chinese Patent Application No. 202010222505.8, filed on Mar. 26, 2020, the full disclosure of which is incorporated herein by reference.

BACKGROUND

Technical Field

The present application relates to transmission methods and devices in wireless communication systems, and in particular to a transmission method and device of a radio signal in a wireless communication system supporting cellular networks.

Related Art

In a 5G system, Enhance Mobile Broadband (eMBB) and Ultra Reliable and Low Latency Communication (URLLC) are two typical service types. Targeting requirements for lower target BLER of URLLC traffic, a new Modulation and Coding Scheme (MCS) table has been defined in 3rd Generation Partner Project (3GPP) New Radio (NR) Release 15. For the purpose of supporting more demanding Ultra Reliable and Low Latency Communication (URLLC) traffics in 5G system, for example, with higher reliability (e.g., a target BLER is 10^-6) or with lower delay (e.g., 0.5-1 ms), in 3GPP NR Release 16, a DCI signaling can indicate a scheduled PDSCH is of Low Priority or High Priority, where the Low Priority corresponds to URLLC traffics, while the High Priority corresponds to eMBB traffics. When a low-priority transmission overlaps with a high-priority transmission in time domain, the high-priority one is performed, while the low-priority one is dropped. In NR system, a number of Resource Element(s) (RE(s)) occupied by uplink control information on an uplink physical-layer data channel can be dynamically adjusted by an uplink scheduling signaling, so as to meet different requirements of different application scenarios on the transmission reliability of the physical layer.

A Work Item (WI) of URLLC enhancement in NR Release 17 was approved at 3GPP RAN #86 Plenary, where multiplexing of services of different intra-User Equipment (UE) priorities is a focus to be studied.

SUMMARY

Inventors have found through researches that when a scheduling signaling corresponding to control information appears after a scheduling signaling of a physical-layer data channel, the demand of the control information may not be taken into account in the scheduling signaling of the physical-layer data channel. Considering multiple service priorities, how to flexibly adjust a number of RE(s) occupied by the control information on a data channel is a key problem to be studied.

Inventors have found through researches that considering multiple service priorities, under what conditions can two transmissions be multiplexed is a key issue to be studied.

To address the above problem, the present application provides a solution. In description of the above problem, uplink is illustrated as an example; the present application is also applicable to transmission scenarios of downlink and sidelink to achieve technical effects similar in sidelink. Additionally, the adoption of a unified solution for various scenarios (including but not limited to uplink, downlink and sidelink) contributes to the reduction of hardcore complexity and costs. It should be noted that the embodiments in a UE in the present application and characteristics of the embodiments may be applied to a base station if no conflict is incurred, and vice versa. And the embodiments in the present application and the characteristics in the embodiments can be arbitrarily combined if there is no conflict.

In one embodiment, interpretations of the terminology in the present application refer to definitions given in the 3GPP TS36 series.

In one embodiment, interpretations of the terminology in the present application refer to definitions given in the 3GPP TS38 series.

In one embodiment, interpretations of the terminology in the present application refer to definitions given in the 3GPP TS37 series.

In one embodiment, interpretations of the terminology in the present application refer to definitions given in Institute of Electrical and Electronics Engineers (IEEE) protocol specifications.

The present application provides a method in a first node for wireless communications, comprising:

receiving a first signaling;

receiving a second signaling; and transmitting a first signal in a first radio resource block;

herein, the first signaling is earlier than the second signaling in time domain; the first signaling is used to determine the first radio resource block and a size of a first bit block, the second signaling is used to determine a second bit block, a first signal comprises at least the second sub-signal in a first sub-signal and a second sub-signal, the first sub-signal carries the first bit block, and the second sub-signal carries the second bit block; both the first signaling and the second signaling comprises a first field, a value of the first field in the first signaling is used to indicate a first offset from a first offset set, a value of the first field in the second signaling is used to indicate a second offset from a second offset set, only the second offset in the first offset and the second offset is used to determine a number of RE(s) occupied by the second sub-signal in the first radio resource block; the first signaling is used to determine a first priority, the second signaling is used to determine a second priority, a signaling format of the first signaling is used to determine that the first offset set is related to the first priority, a signaling format of the second signaling is used to determine that the second offset set is unrelated to the second priority, and the signaling format of the first signaling is different from the signaling format of the second signaling.

In one embodiment, a problem to be solved in the present application is: when a scheduling signaling corresponding to control information appears after a scheduling signaling corresponding to a physical-layer data channel, and considering multiple service priorities, how to transmit the control information.

In one embodiment, a problem to be solved in the present application is: when a scheduling signaling corresponding to uplink control information appears after a scheduling signaling corresponding to an uplink physical-layer data channel, and considering multiple service priorities, how to transmit the uplink control information.

In one embodiment, the above method is essential in that the first sub-signal carries data, the second sub-signal carries control information, the first radio resource block is radio resources allocated to a physical-layer data channel, the first signaling and the second signaling are respectively scheduling signalings corresponding to the physical-layer data channel and the control information, and an interpretation for a first field (such as whether it is related to a priority of a scheduling signaling) is related to a signaling format of a scheduling signaling. The advantage of adopting the above method is that it avoids the decrease of transmission quality/transmission efficiency of control information incurred by not taking the demand of the control information into account when scheduling a data channel, and it takes into account a number of RE(s) occupied by the control information on the data channel being flexibly adjusted under multiple service priorities.

In one embodiment, the above method is essential in that the first sub-signal carries uplink data, the second sub-signal carries uplink control information, the first radio resource block is radio resources allocated to an uplink physical-layer data channel, and the first signaling and the second signaling are respectively scheduling signalings corresponding to the uplink physical-layer data channel and the uplink control information, a first field is a beta_offset indicator, an interpretation for a first field (for example, whether it is related to a priority of a scheduling signaling) is related to a signaling format of a scheduling signaling. The advantage of adopting the above method is that it avoids the decrease of the transmission quality/transmission efficiency of the uplink control information incurred by not taking the demand of the uplink control information into account when scheduling an uplink data channel, and it takes into account a number of RE(s) occupied by the uplink control information on the uplink physical-layer data channel being flexibly adjusted under multiple service priorities.

According to one aspect of the present application, the above method is characterized in comprising:

receiving a second signal;

herein, the second signaling is used to determine time-frequency resources occupied by the second signal, and the second bit block is related to the second signal.

According to one aspect of the present application, the above method is characterized in comprising:

receiving a first information block and a second information block;

herein, the first information block is used to indicate the first reference offset set, the second information block is used to indicate the second reference offset set, a first reference priority corresponds to the first reference offset set, and a second reference priority corresponds to the second reference offset set; when the first priority is the first reference priority, the first offset set is the first reference offset set; when the first priority is the second reference priority, the first offset set is the second reference offset set.

According to one aspect of the present application, the above method is characterized in that the first priority is used to determine the second offset set.

In one embodiment, the above method is essential in that a priority of a physical-layer data channel is used for an interpretation for a first field in a scheduling signaling of the control information. The advantage of adopting the above method is that a transmission of the control information on the physical-layer data channel takes a priority of the physical-layer data channel into account, and takes into account the transmission reliability of the physical-layer data channel and the transmission reliability/transmission efficiency of the control information.

According to one aspect of the present application, the above method is characterized in that the second offset set is unrelated to the first priority.

According to one aspect of the present application, the above method is characterized in comprising:

receiving a third information block;

herein, the third information block is used to indicate the second offset set.

According to one aspect of the present application, the above method is characterized in that the number of RE(s) occupied by the second sub-signal in the first radio resource block is equal to a minimum value of a first value and a first limit value, and the second offset is used to determine the first value.

The present application provides a method in a second node for wireless communications, comprising:

transmitting a first signaling;

transmitting a second signaling; and receiving a first signal in a first radio resource block;

herein, the first signaling is earlier than the second signaling in time domain; the first signaling is used to determine the first radio resource block and a size of a first bit block, the second signaling is used to determine a second bit block, a first signal comprises at least the second sub-signal in a first sub-signal and a second sub-signal, the first sub-signal carries the first bit block, and the second sub-signal carries the second bit block; both the first signaling and the second signaling comprises a first field, a value of the first field in the first signaling is used to indicate a first offset from a first offset set, a value of the first field in the second signaling is used to indicate a second offset from a second offset set, only the second offset in the first offset and the second offset is used to determine a number of RE(s) occupied by the second sub-signal in the first radio resource block; the first signaling is used to determine a first priority, the second signaling is used to determine a second priority, a signaling format of the first signaling is used to determine that the first offset set is related to the first priority, a signaling format of the second signaling is used to determine that the second offset set is unrelated to the second priority, and the signaling format of the first signaling is different from the signaling format of the second signaling.

According to one aspect of the present application, the above method is characterized in comprising:

transmitting a second signal;

herein, the second signaling is used to determine time-frequency resources occupied by the second signal, and the second bit block is related to the second signal.

According to one aspect of the present application, the above method is characterized in comprising:

transmitting a first information block and a second information block;

herein, the first information block is used to indicate the first reference offset set, the second information block is used to indicate the second reference offset set, a first reference priority corresponds to the first reference offset set, and a second reference priority corresponds to the second reference offset set; when the first priority is the first reference priority, the first offset set is the first reference offset set; when the first priority is the second reference priority, the first offset set is the second reference offset set.

According to one aspect of the present application, the above method is characterized in that the first priority is used to determine the second offset set.

According to one aspect of the present application, the above method is characterized in that the second offset set is unrelated to the first priority.

According to one aspect of the present application, the above method is characterized in comprising:

transmitting a third information block;

herein, the third information block is used to indicate the second offset set.

According to one aspect of the present application, the above method is characterized in that the number of RE(s) occupied by the second sub-signal in the first radio resource block is equal to a minimum value of a first value and a first limit value, and the second offset is used to determine the first value.

The present application provides a first node for wireless communications, comprising:

a first receiver, receiving a first signaling; receiving a second signaling; and a first transmitter, transmitting a first signal in a first radio resource block;

herein, the first signaling is earlier than the second signaling in time domain; the first signaling is used to determine the first radio resource block and a size of a first bit block, the second signaling is used to determine a second bit block, a first signal comprises at least the second sub-signal in a first sub-signal and a second sub-signal, the first sub-signal carries the first bit block, and the second sub-signal carries the second bit block; both the first signaling and the second signaling comprises a first field, a value of the first field in the first signaling is used to indicate a first offset from a first offset set, a value of the first field in the second signaling is used to indicate a second offset from a second offset set, only the second offset in the first offset and the second offset is used to determine a number of RE(s) occupied by the second sub-signal in the first radio resource block; the first signaling is used to determine a first priority, the second signaling is used to determine a second priority, a signaling format of the first signaling is used to determine that the first offset set is related to the first priority, a signaling format of the second signaling is used to determine that the second offset set is unrelated to the second priority, and the signaling format of the first signaling is different from the signaling format of the second signaling.

The present application provides a second node for wireless communications, comprising:

a second transmitter, transmitting a first signaling; transmitting a second signaling; and a second receiver, receiving a signal in a first radio resource block;

herein, the first signaling is earlier than the second signaling in time domain; the first signaling is used to determine the first radio resource block and a size of a first bit block, the second signaling is used to determine a second bit block, a first signal comprises at least the second sub-signal in a first sub-signal and a second sub-signal, the first sub-signal carries the first bit block, and the second sub-signal carries the second bit block; both the first signaling and the second signaling comprises a first field, a value of the first field in the first signaling is used to indicate a first offset from a first offset set, a value of the first field in the second signaling is used to indicate a second offset from a second offset set, only the second offset in the first offset and the second offset is used to determine a number of RE(s) occupied by the second sub-signal in the first radio resource block; the first signaling is used to determine a first priority, the second signaling is used to determine a second priority, a signaling format of the first signaling is used to determine that the first offset set is related to the first priority, a signaling format of the second signaling is used to determine that the second offset set is unrelated to the second priority, and the signaling format of the first signaling is different from the signaling format of the second signaling.

In one embodiment, the method in the present application is advantageous in the following aspects:

when a scheduling signaling corresponding to the control information appears after a scheduling signaling corresponding to the physical-layer data channel, it avoids the decrease of the transmission quality/transmission efficiency of the control information incurred by not taking the demand of the control information into account when scheduling the data channel, and it takes into account a number of RE(s) occupied by the control information on the data channel being flexibly adjusted under multiple service priorities.

The present application provides a method in a first node for wireless communications, comprising:

receiving a first signaling, the first signaling being used to indicate a first radio resource block;

receiving a second signaling, the second signaling being used to indicate a second radio resource block; and transmitting a first signal in the first radio resource block, or, transmitting a second signal in the second radio resource block;

herein, the first signaling is used to determine a size of a first bit block, the second signaling is used to determine a second bit block, the first signal comprises at least the second sub-signal of a first sub-signal and a second sub-signal, the first sub-signal carries the first bit block, the second sub-signal carries the second bit block, and the second signal carries the second bit block; when a first value is less than a first limit value, the first signal is transmitted in the first radio resource block; when the first value is greater than the first limit value, the second signal is transmitted in the second radio resource block; a number of bit(s) comprised in the second bit block and a first offset are used together to determine the first value, and the first limit value is not greater than a number of RE(s) comprised in the first radio resource block; the first value is a positive integer, the first limit value is a positive integer, and the first offset is a positive integer.

In one embodiment, a problem to be solved in the present application is taking multiple service priorities into account, under what conditions can two transmissions be multiplexed.

In one embodiment, a problem to be solved in the present application is: when a high priority uplink transmission and a low priority uplink transmission collide in time domain, under what conditions can multiplexing be performed.

In one embodiment, the above method is essential in that a first signaling and a second signaling respectively schedule a first transmission and a second transmission, a first signal corresponds to the case where two transmissions are multiplexed, and a second signal corresponds to the case where two transmissions are not multiplexed, a first value represents a resource size required when the second transmission is multiplexed onto the first transmission, and a second limit value represents a maximum resource size that can be allocated to the second transmission on the first transmission; the second transmission is multiplexed into the first transmission only when the first transmission meets the requirement of the second transmission, otherwise it is not multiplexed. The advantage of adopting the above method is that the transmission conflict can be more appropriately solved and the transmission reliability can be better guaranteed through the proposed multiplexing conditions.

In one embodiment, the above method is essential in that a first signaling schedules a low priority Physical Uplink Shared CHannel (PUSCH), a second signaling schedules a high priority Physical Uplink Control CHannel (PUCCH), a first signal corresponds to the case where Uplink control information (UCI) is multiplexed to the PUSCH for transmission, a second signal corresponds to the case where the UCI is still transmitted on the PUCCH and the PUSCH is dropped for transmission, a first value represents a number of RE(s) required when the UCI is multiplexed to the PUSCH, and a second limit value represents a maximum number of RE(s) that can be allocated to the UCI on the PUSCH; the UCI is multiplexed into the PUSCH only when the PUSCH meets the requirements of UCI transmission reliability. The advantage of adopting the above method is that the transmission conflict can be more appropriately solved and the transmission reliability of high priority services can be better guaranteed through the proposed multiplexing conditions.

According to one aspect of the present application, the method is characterized in that the first signaling is used to determine a first priority, the second signaling is used to determine a second priority, the second priority being higher than the first priority.

In one embodiment, the advantage of adopting the above method is that when a low priority transmission overlaps with a high priority transmission in time domain, compared with that the high priority transmission in 3GPP NR release 16 is performed while the low priority transmission is dropped, the proposed method can realize multiplexing under certain conditions, and ensure that the transmission reliability of the high priority service is not lower than that of the NR release 16.

According to one aspect of the present application, the method is characterized in that the first radio resource block comprises a second resource sub-block, a product of a number of RE(s) comprised in the second resource sub-block and a second offset is used to determine the first limit value, and the second offset is a positive integer not greater than 1.

According to one aspect of the present application, the above method is characterized in comprising:

receiving a first information block;

herein, the first information block is used to indicate the second offset.

According to one aspect of the present application, the above method is characterized in that the first radio resource block comprises a first resource sub-block, and a number of RE(s) comprised in the first resource sub-block and a number of bit(s) comprised in the first bit block are used to determine a first-type reference value; a second-type reference value corresponds to the second radio resource block, and the second-type reference value is not greater than a maximum code rate of the second radio resource block; the first reference value and the second-type reference value are used together to determine the first offset.

In one embodiment, the above method is essential in that a first-type reference value represents a code rate of a first transmission, and a second-type reference value represents a code rate of a second transmission, and a first offset is dynamically determined according to code rate requirements of the second transmission, so the reliability of the second transmission can be better guaranteed.

In one embodiment, the above method is essential in that a first-type reference value represents a code rate of a PUSCH, and a second-type reference value represents a code rate of UCI, a first offset is dynamically determined according to code rate requirements of UCI, and the transmission reliability of the UCI can be better guaranteed.

According to one aspect of the present application, the above method is characterized in comprising:

receiving a second information block;

herein, the second information block is used to indicate a first offset set, the first offset is an offset in the first offset set; the first offset set comprises a positive integer number of offset(s), and any offset in the first offset set is a non-negative real number.

According to one aspect of the present application, the above method is characterized in comprising:

receiving a third signal;

herein, the second signaling is used to determine time-frequency resources occupied by the third signal, and the second bit block is generated for the third signal.

The present application provides a method in a second node for wireless communications, comprising:

transmitting a first signaling, the first signaling being used to indicate a first radio resource block;

transmitting a second signaling, the second signaling being used to indicate a second radio resource block;

receiving a first signal in the first radio resource block, or, receiving a second signal in the second radio resource block;

herein, the first signaling is used to determine a size of a first bit block, the second signaling is used to determine a second bit block, the first signal comprises at least the second sub-signal of a first sub-signal and a second sub-signal, the first sub-signal carries the first bit block, the second sub-signal carries the second bit block, and the second signal carries the second bit block; when a first value is less than a first limit value, the first signal is transmitted in the first radio resource block; when the first value is greater than the first limit value, the second signal is transmitted in the second radio resource block; a number of bit(s) comprised in the second bit block and a first offset are used together to determine the first value, and the first limit value is not greater than a number of RE(s) comprised in the first radio resource block; the first value is a positive integer, the first limit value is a positive integer, and the first offset is a positive integer.

According to one aspect of the present application, the method is characterized in that the first signaling is used to determine a first priority, the second signaling is used to determine a second priority, the second priority being higher than the first priority.

According to one aspect of the present application, the method is characterized in that the first radio resource block comprises a second resource sub-block, a product of a number of RE(s) comprised in the second resource sub-block and a second offset is used to determine the first limit value, and the second offset is a positive integer not greater than 1.

According to one aspect of the present application, the above method is characterized in comprising:

transmitting a first information block;

herein, the first information block is used to indicate the second offset.

According to one aspect of the present application, the above method is characterized in that the first radio resource block comprises a first resource sub-block, and a number of RE(s) comprised in the first resource sub-block and a number of bit(s) comprised in the first bit block are used to determine a first-type reference value; a second-type reference value corresponds to the second radio resource block, and the second-type reference value is not greater than a maximum code rate of the second radio resource block; the first reference value and the second-type reference value are used together to determine the first offset.

According to one aspect of the present application, the above method is characterized in comprising:

transmitting a second information block;

herein, the second information block is used to indicate a first offset set, the first offset is an offset in the first offset set; the first offset set comprises a positive integer number of offset(s), and any offset in the first offset set is a non-negative real number.

According to one aspect of the present application, the above method is characterized in comprising:

transmitting a third signal;

herein, the second signaling is used to determine time-frequency resources occupied by the third signal, and the second bit block is generated for the third signal.

The present application provides a first node for wireless communications, comprising:

a first receiver, receiving a first signaling, the first signaling being used to indicate a first radio resource block; receiving a second signaling, the second signaling being used to indicate a second radio resource block;

a first transmitter, transmitting a first signal in the first radio resource block, or, transmitting a second signal in the second radio resource block;

herein, the first signaling is used to determine a size of a first bit block, the second signaling is used to determine a second bit block, the first signal comprises at least the second sub-signal of a first sub-signal and a second sub-signal, the first sub-signal carries the first bit block, the second sub-signal carries the second bit block, and the second signal carries the second bit block; when a first value is less than a first limit value, the first signal is transmitted in the first radio resource block; when the first value is greater than the first limit value, the second signal is transmitted in the second radio resource block; a number of bit(s) comprised in the second bit block and a first offset are used together to determine the first value, and the first limit value is not greater than a number of RE(s) comprised in the first radio resource block; the first value is a positive integer, the first limit value is a positive integer, and the first offset is a positive integer.

The present application provides a second node for wireless communications, comprising:

a second transmitter, transmitting a first signaling, the first signaling being used to indicate a first radio resource block; transmitting a second signaling, the second signaling being used to indicate a second radio resource block;

a second receiver, receiving a first signal in the first radio resource block, or, receiving a second signal in the second radio resource block;

herein, the first signaling is used to determine a size of a first bit block, the second signaling is used to determine a second bit block, the first signal comprises at least the second sub-signal of a first sub-signal and a second sub-signal, the first sub-signal carries the first bit block, the second sub-signal carries the second bit block, and the second signal carries the second bit block; when a first value is less than a first limit value, the first signal is transmitted in the first radio resource block; when the first value is greater than the first limit value, the second signal is transmitted in the second radio resource block; a number of bit(s) comprised in the second bit block and a first offset are used together to determine the first value, and the first limit value is not greater than a number of RE(s) comprised in the first radio resource block; the first value is a positive integer, the first limit value is a positive integer, and the first offset is a positive integer.

In one embodiment, the method in the present application is advantageous in the following aspects:

by the method proposed in the present application, the transmission conflict can be more appropriately solved and the transmission reliability can be better guaranteed;

when a low priority transmission overlaps with a high priority transmission in time domain, compared with that the high priority transmission in 3GPP NR release 16 is performed while the low priority transmission is dropped, the method proposed in the present application can realize multiplexing under certain conditions, and ensure that the transmission reliability of the high priority service is not lower than that of the NR release 16;

in the method proposed in the application, betaoffset can be dynamically determined according to a PUCCH code rate and a PUSCH code rate, and the transmission reliability of UCI can be better guaranteed.

BRIEF DESCRIPTION OF THE DRAWINGS

Other features, objects and advantages of the present application will become more apparent from the detailed description of non-restrictive embodiments taken in conjunction with the following drawings.

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1A

Figure 1A:
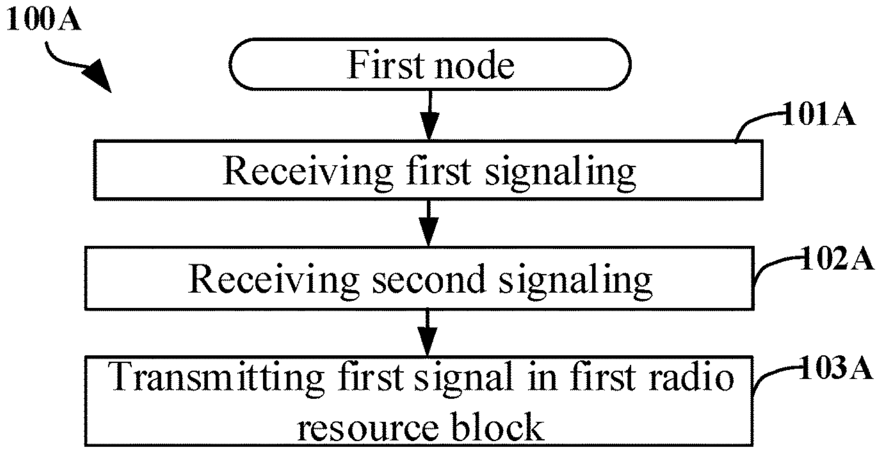
FIG. 1A illustrates a flowchart of a first signaling, a second signaling and a first signal according to one embodiment of the present application.

Embodiment 1A illustrates a flowchart of a first signaling, a second signaling and a first signal according to one embodiment of the present application, as shown in FIG. 1A. In FIG. 1A, each box represents a step. Particularly, the sequential order of steps in these boxes does not necessarily mean that the steps are chronologically arranged.

In Embodiment 1A, the first node in the present application receives a first signaling in step 101A; receives a second signaling in step 102A; transmits a first signal in a first radio resource block in step 103A; herein, the first signaling is earlier than the second signaling in time domain; the first signaling is used to determine the first radio resource block and a size of a first bit block, the second signaling is used to determine a second bit block, a first signal comprises at least the second sub-signal in a first sub-signal and a second sub-signal, the first sub-signal carries the first bit block, and the second sub-signal carries the second bit block; both the first signaling and the second signaling comprises a first field, a value of the first field in the first signaling is used to indicate a first offset from a first offset set, a value of the first field in the second signaling is used to indicate a second offset from a second offset set, only the second offset in the first offset and the second offset is used to determine a number of RE(s) occupied by the second sub-signal in the first radio resource block; the first signaling is used to determine a first priority, the second signaling is used to determine a second priority, a signaling format of the first signaling is used to determine that the first offset set is related to the first priority, a signaling format of the second signaling is used to determine that the second offset set is unrelated to the second priority, and the signaling format of the first signaling is different from the signaling format of the second signaling.

In one embodiment, a start time for transmitting the first signaling is earlier than a start time for transmitting the second signaling.

In one embodiment, an end time for transmitting the first signaling is earlier than an end time for transmitting the second signaling.

In one embodiment, an end time for transmitting the first signaling is earlier than a start time for transmitting the second signaling.

In one embodiment, the first signaling is a Radio Resource Control (RRC) signaling.

In one embodiment, the first signaling is a Medium Access Control layer Control Element (MAC CE) signaling.

In one embodiment, the first signaling is a physical-layer signaling.

In one embodiment, the first signaling is a Downlink Control Information (DCI) signaling.

In one embodiment, the first signaling is an uplink grant DCI signaling.

In one embodiment, the first signaling is transmitted on a downlink physical layer control channel (i.e., a downlink channel only capable of carrying a physical-layer signaling).

In one embodiment, the first signaling schedules a Semi-Persistent Scheduling (SPS) transmission.

In one embodiment, the first signaling schedules a configured grant transmission.

In one embodiment, the first signaling comprises a DCI identified by Cell Radio Network Temporary Identifier (C-RNTI).

In one embodiment, the first signaling comprises a DCI identified by Configured Scheduling (CS)-RNTI.

In one embodiment, the first signaling schedules a PUSCH.

In one embodiment, the second signaling is dynamically configured.

In one embodiment, the second signaling is a physical-layer signaling.

In one embodiment, the second signaling is a DCI signaling.

In one embodiment, the second signaling is a downlink grant DCI signaling.

In one embodiment, the second signaling is transmitted on a downlink physical layer control channel (i.e., a downlink channel only capable of bearing a physical-layer signaling).

In one embodiment, the second signaling schedules a Physical Downlink Shared CHannel (PDSCH).

In one embodiment, the second signaling comprises a DCI identified by a C-RNTI.

In one embodiment, the first signaling is used to schedule an uplink transmission, and the second signaling is used to schedule a downlink transmission.

In one embodiment, the first signaling is used to schedule an uplink transmission, and the second signaling is used to schedule a sidelink transmission.

In one embodiment, the first signaling is used to indicate the first radio resource block.

In one embodiment, the first signaling explicitly indicates the first radio resource block.

In one embodiment, the first signaling implicitly indicates the first radio resource block.

In one embodiment, the first signaling is used to determine a first radio resource block set, the first radio resource block is a radio resource block in the first radio resource block set, and the first radio resource block set comprises multiple mutually-orthogonal radio resource blocks in time domain.

In one embodiment, the first signaling comprises a third field, and the third field of the first signaling indicates frequency-domain resources occupied by the first radio resource block.

In one subembodiment of the above embodiment, the third field in the first signaling comprises all or partial information in a Frequency domain resource assignment field.

In one embodiment, the first signaling comprises a fourth field, and the fourth field of the first signaling indicates time-domain resources occupied by the first radio resource block.

In one subembodiment of the above embodiment, the fourth field in the first signaling comprises all or partial information in a Time domain resource assignment field.

In one embodiment, for the specific meaning of the Frequency domain resource assignment field, refer to 3GPP TS38.212.

In one embodiment, for the specific meaning of the Time domain resource assignment field, refer to 3GPP TS38.212.

In one embodiment, the first bit block comprises a positive integer number of bit(s).

In one embodiment, the first bit block comprises a positive integer number of TB(s).

In one embodiment, the first bit block comprises one TB.

In one embodiment, the size of the first bit block refers to a number of bit(s) comprised in the first bit block.

In one embodiment, the size of the first bit block refers to a Transport Block Size (TBS).

In one embodiment, the size of the first bit block refers to a TBS of a TB comprised in the first bit block.

In one embodiment, the first signaling is used to indicate a size of the first bit block.

In one embodiment, the first signaling implicitly indicates a size of the first bit block.

In one embodiment, a size of the first bit block is related to a number of RE(s) comprised in the first radio resource block.

In one embodiment, a size of the first bit block is related to an MCS of the first signal.

In one embodiment, the first signaling indicates the first radio resource block and an MCS of the first signal, and a number of RE(s) comprised in the first radio signal and an MCS of the first signal are used together to determine a size of the first bit block.

In one embodiment, the first signaling indicates scheduling information of the first signal in the present application.

In one embodiment, the scheduling information of the first signal comprises at least one of occupied time-domain resources, occupied frequency-domain resources, an MCS, configuration information of DMRS, a HARQ process number, an RV or an NDI.

In one subembodiment of the above embodiment, configuration information of the DMRS comprises at least one of a Reference Signal (RS) sequence, a mapping mode, a DMRS type, occupied time-domain resources, occupied frequency-domain resources, occupied code-domain resources, a cyclic shift, or an Orthogonal Cover Code (OCC).

In one embodiment, the first radio resource block comprises time-domain resources and frequency-domain resources.

In one embodiment, the first radio resource block comprises time-domain resources, frequency-domain resources and code-domain resources.

In one embodiment, the first radio resource block comprises a positive integer number of RE(s).

In one embodiment, the radio resource block comprises time-domain resources and frequency-domain resources.

In one embodiment, the radio resource block comprises time-domain resources, frequency-domain resources and code-domain resources.

In one embodiment, the radio resource block comprises a positive integer number of RE(s).

In one embodiment, the second radio resource block comprise time-domain resources and frequency-domain resources.

In one embodiment, the second radio resource block comprise time-domain resources, frequency-domain resources and code-domain resources.

In one embodiment, the second radio resource block comprises a positive integer number of RE(s).

In one embodiment, the second signaling is used to determine a second radio resource block, and the first radio resource block and the second radio resource block are not orthogonal in time domain.

In one subembodiment of the above embodiment, the first radio resource block and the second radio resource block are partially or completely overlapped in time domain.

In one subembodiment of the above embodiment, the second signaling is used to indicate the second radio resource block.

In one subembodiment of the above embodiment, the second signaling explicitly indicates the second radio resource block.

In one subembodiment of the above embodiment, the second signaling implicitly indicates the second radio resource block.

In one subembodiment of the above embodiment, the second radio resource block is reserved for the second bit block.

In one embodiment, the second signaling comprises a fifth field, where the fifth field in the second signaling indicates the second radio resource block.

In one subembodiment of the above embodiment, the fifth field in the second signaling is used to indicate the second radio resource block from a second radio resource block set, the second radio resource block set comprises a positive integer number of radio resource block(s), and the second radio resource block set is indicated by a higher-layer signaling.

In one subembodiment of the above embodiment, the fifth field in the second signaling is used to indicate an index of the second radio resource block.

In one subembodiment of the above embodiment, the fifth field in the second signaling comprises a PUCCH resource indicator field.

In one embodiment, for the specific meaning of the PUCCH resource indicator field, refer to 3GPP TS38. 212.

In one embodiment, an index of the second radio resource block is a PUCCH resource index.

In one embodiment, the second bit block comprises a positive integer number of bit(s).

In one embodiment, the second bit block carries a UCI.

In one embodiment, the second bit block carries a Hybrid Automatic Repeat reQuest-Acknowledgement (HARQ-ACK).

In one embodiment, the second bit block carries a Scheduling Request (SR).

In one embodiment, the second bit block carries Channel-State Information (CSI).

In one embodiment, the CSI comprises one or more of a Channel-state information reference signals Resource Indicator (CRI), a Precoding Matrix Indicator (PMI), a Reference Signal Received Power (RSRP), a Reference Signal Received Quality (RSRQ) and a Channel Quality Indicator (CQI).

In one embodiment, the second bit block comprises a second information bit block and a second check bit block, and the second check bit block is generated by a CRC bit block of the second information bit block.

In one subembodiment of the above embodiment, the second check bit block is a CRC bit block of the second information bit block.

In one subembodiment of the above embodiment, the second check bit block is a bit block after a CRC bit block of the second information bit block is scrambled.

In one embodiment, the first signal comprises the first sub-signal and the second sub-signal.

In one embodiment, the first signal comprises only the second sub-signal in the first sub-signal and the second sub-signal.

In one embodiment, the phrase of the first sub-signal carrying the first bit block comprises: the first sub-signal is an output after a bit in the first bit block sequentially through Cyclic Redundancy Check (CRC) Attachment, Segmentation, Coding block (CB) level CRC Attachment, Channel Coding, Rate Matching, Concatenation, Scrambling, Modulation Mapper, Layer Mapper, transform precoder, Precoding, Resource Element Mapper, multicarrier symbol generation, and Modulation and Upconversion.

In one embodiment, the phrase of the first sub-signal carrying the first bit block comprises: the first sub-signal is an output after a bit in the first bit block is sequentially through CRC Attachment, Segmentation, Coding block (CB) level CRC Attachment, Channel Coding, Rate Matching, Concatenation, Scrambling, Modulation Mapper, Layer Mapper, Precoding, Resource Element Mapper, multicarrier symbol generation, and Modulation and Upconversion.

In one embodiment, the phrase of the first sub-signal carrying the first bit block comprises: the first bit block is used to generate the first sub-signal.

In one embodiment, the first sub-signal is unrelated to the second bit block.

In one embodiment, the phrase of second sub-signal carrying the second bit block comprises: the second sub-signal is an output acquired after a bit in the second bit block sequentially through CRC attachment, channel coding, rate matching, a Modulation Mapper, a Layer Mapper, a transform precoder, Precoding, a Resource Element Mapper, Generation of multicarrier symbol, and Modulation and Upconversion.

In one embodiment, the phrase of second sub-signal carrying the second bit block comprises: the second sub-signal is an output acquired after a bit in the second bit block sequentially through CRC Attachment, channel coding, rate matching, a Modulation Mapper, a Layer Mapper, Precoding, a Resource Element Mapper, Generation of multicarrier symbol, and Modulation and Upconversion.

In one embodiment, the phrase of second sub-signal carrying the second bit block comprises: the second bit block is used to generate the second sub-signal.

In one embodiment, the second sub-signal is unrelated to the first bit block.

In one embodiment, the first sub-signal and the second sub-signal occupy mutually-orthogonal resource elements within the first radio resource block.

In one embodiment, the first field comprises all or partial information in a beta_offset indicator field.

In one embodiment, for the specific meaning of the beta_offset indicator field, refer to 3GPP TS38. 212.

In one embodiment, the first field in the first signaling comprises a positive integer number of bit(s), and the first field in the second signaling comprises a positive integer number of bit(s).

In one embodiment, a number of bit(s) comprised in the first field in the first signaling is the same as a number of bit(s) comprised in the first field in the second signaling.

In one embodiment, a number of bit(s) comprised in the first field in the first signaling is different from a number of bit(s) comprised in the first field in the second signaling.

In one embodiment, a value of the first field in the first signaling is an index of the first offset in the first offset set, and a value of the first field in the second signaling is an index of the second offset in the second offset set.

In one embodiment, a value of the first field in the first signaling is one of N1 values, the first offset set comprises N1 offsets, the N1 values respectively correspond to N1 offsets, and the first offset is a offset corresponding to a value of the first field in the first signaling among the N1 offsets, N1 being a positive integer greater than 1; a value of the first field in the second signaling is one of N2 values, the second offset set comprises N2 offsets, the N2 values respectively correspond to N2 offsets, and the second offset is an offset corresponding to the value of the first field in the second signaling among the N2 offsets, N2 being a positive integer greater than 1.

In one subembodiment of the above embodiment, N1 is equal to N2.

In one subembodiment of the above embodiment, N1 is different from the N2.

In one embodiment, the first offset is not used to determine a number of RE(s) occupied by the second sub-signal in the first radio resource block.

In one embodiment, the first offset is a non-negative real number.

In one embodiment, the second offset is a non-negative real number.

In one embodiment, the first offset set comprises a positive integer number of offset(s), and any offset in the first offset set is a non-negative real number.

In one embodiment, the second offset set comprises a positive integer number of offset(s), and any offset in the second offset set is a non-negative real number.

In one embodiment, the first offset set comprises a positive integer number of offset(s), and there exists at least one offset less than 1 in the first offset set.

In one embodiment, the first offset set comprises a positive integer number of offset(s), and there exists at least one offset not less than 1 in the first offset set.

In one embodiment, the first offset set comprises a positive integer number of offset(s), and there exists at least one offset less than 1 and at least one offset not less than 1 in the first offset set.

In one embodiment, the first offset is $$\beta_{offset}^{PUSCH},$$

and the second offset is $$\beta_{offset}^{PUSCH}.$$

In one embodiment, for the specific meaning of the $$\beta_{offset}^{PUSCH},$$

refer to section 6.3.2 in 3GPP TS38.212.

In one embodiment, the first offset is $$\beta_{offset}^{HARQ-ACK},$$

and the second offset is $$\beta_{offset}^{HARQ-ACK}.$$

In one embodiment, for the specific meaning of the $$\beta_{offset}^{HARQ-ACK},$$

refer to section 6.3.2 in 3GPP TS38.212.

In one embodiment, the first offset is $$\beta_{offset}^{CSI-1},$$

and the second offset is $$\beta_{offset}^{CSI-1}.$$

In one embodiment, for the specific meaning of the $$\beta_{offset}^{CSI-1},$$

refer to section 6.3.2 in 3GPP TS38.212.

In one embodiment, the first offset is $$\beta_{offset}^{CSI-2},$$

and the second offset is $$\beta_{offset}^{CSI-2}.$$

In one embodiment, for the specific meaning of the $$\beta_{offset}^{CSI-2},$$

refer to section 6.3.2 in 3GPP TS38.212.

In one embodiment, the first offset is $$\beta_{offset}^{AUL-UCI},$$

and the second offset is $$\beta_{offset}^{AUL-UCI}.$$

In one embodiment, for the specific meaning of the $$\beta_{offset}^{AUL-UCI},$$

refer to section 5.2 in 3GPP TS36.212 (V15.3.0).

In one embodiment, the first offset is $$\beta_{offset}^{CG-UCI},$$

and the second offset is $$\beta_{offset}^{CG-UCI}.$$

In one embodiment, for the specific meaning of the $$\beta_{offset}^{CG-UCI},$$

refer to section 6.3.2 in 3GPP TS38.212.

In one embodiment, the resource element is an RE.

In one embodiment, the RE occupies a multicarrier symbol in time domain, and a subcarrier in frequency domain.

In one embodiment, the multicarrier symbol is an Orthogonal Frequency Division Multiplexing (OFDM) symbol.

In one embodiment, the multicarrier symbol is a Single Carrier-Frequency Division Multiple Access (SC-FDMA) symbol.

In one embodiment, the multicarrier symbol is a Discrete Fourier Transform Spread OFDM (DFT-S-OFDM) symbol.

In one embodiment, the first priority and the second priority are different.

In one embodiment, the first priority and the second priority are the same.

In one embodiment, a signaling identifier of the first signaling is used to determine a first priority.

In one embodiment, a signaling identifier of the second signaling is used to determine a second priority.

In one embodiment, the first priority is a priority of the first sub-signal.

In one embodiment, the first priority is a priority of the first bit block.

In one embodiment, the second priority is a priority of the second signal in the present application.

In one embodiment, the second priority is a priority of the second bit block.

In one embodiment, the first priority is configured by a higher-layer signaling.

In one embodiment, the second priority is configured by a higher-layer signaling.

In one embodiment, the first signaling carries a first identifier, and the first identifier is used to determine whether a first priority is configured by a higher-layer signaling or indicated by the first signaling.

In one embodiment, the second signaling carries a second identifier, and the second identifier is used to determine whether the second priority is configured by a higher-layer signaling or indicated by the second signaling.

In one embodiment, the first signaling carries a first identifier; when the first identifier belongs to a first identifier set, the first priority is configured by a higher-layer signaling; when the first identifier belongs to a second identifier set, the first priority is indicated by the first signaling.

In one embodiment, the second signaling carries a second identifier; when the second identifier belongs to a first identifier set, the second priority is configured by a higher-layer signaling; when the second identifier belongs to a second identifier set, the second priority is indicated by the first signaling.

In one embodiment, the first identifier set comprises a CS-RNTI.

In one embodiment, the second identifier set comprises a Cell-RNTI (C-RNTI).

In one embodiment, the second identifier set comprises an MCS-C-RNTI.

In one embodiment, any identifier in the first identifier set does not belong to the second identifier set.

In one embodiment, any of the first identifier set and the second identifier set is an RNTI.

In one embodiment, any of the first identifier set and the second identifier set is a non-negative integer.

In one embodiment, any of the first identifier set and the second identifier set is a signaling identifier of a DCI signaling.

In one embodiment, any signaling in the first identifier set and the second identifier set is used to generate an RS sequence of a DMRS of a DCI signaling.

In one embodiment, any identifier in the first identifier set and the second identifier set is used to scramble a CRC bit sequence of a DCI signaling.

In one embodiment, the first identifier is a non-negative integer.

In one embodiment, the first identifier is a signaling identifier of the first signaling.

In one embodiment, the first identifier is used to generate an RS sequence of a DMRS of the first signaling.

In one embodiment, a CRC bit sequence of the first signaling is scrambled by the first identifier.

In one embodiment, the second identifier is a non-negative integer.

In one embodiment, the second identifier is a signaling identifier of the second signaling.

In one embodiment, the second identifier is used to generate an RS sequence of a DMRS of the second signaling.

In one embodiment, a CRC bit sequence of the second signaling is scrambled by the second identifier.

In one embodiment, the first signaling schedules an SPS transmission, a higher-layer signaling indicates configuration information of the SPS transmission, and configuration information of the SPS transmission comprises the first priority.

In one embodiment, the first signaling schedules a configured grant transmission, a higher-layer signaling indicates configuration information of the configured grant transmission, and configuration information of the configuration grant transmission comprises the first priority.

In one embodiment, the second signaling schedules an SPS transmission, an RRC signaling indicates configuration information of the SPS transmission, and configuration information of the SPS transmission comprises the second priority.

In one embodiment, a signaling identifier of the first signaling is an RNTI, and a signaling identifier of the second signaling is an RNTI.

In one embodiment, a signaling identifier of the first signaling is a non-negative integer, and a signaling identifier of the second signaling is a non-negative integer.

In one embodiment, a signaling identifier of the first signaling is used to generate an RS sequence of a DMRS of the first signaling, and a signaling identifier of the second signaling is used to generate an RS sequence of a DMRS of the first signaling.

In one embodiment, a signaling identifier of the first signaling is used to scramble a CRC bit sequence of a DCI signaling, and a signaling identifier of the second signaling is used to scramble a CRC bit sequence of a DCI signaling.

In one embodiment, the first signaling is used to indicate a first priority.

In one embodiment, the second signaling is used to indicate a second priority.

In one embodiment, the first signaling explicitly indicates a first priority.

In one embodiment, the second signaling explicitly indicates a second priority.

In one embodiment, the first signaling implicitly indicates a first priority.

In one embodiment, the second signaling implicitly indicates a second priority.

In one embodiment, the first signaling comprises a second field, the second field in the first signaling indicates a first priority, and the second field in the first signaling comprises a positive integer number of bit(s).

In one embodiment, a higher-layer signaling is used to indicate that the first signaling comprises the second field.

In one embodiment, the second signaling comprises a second field, the second field in the second signaling indicates a second priority, and the second field in the second signaling comprises a positive integer number of bit(s).

In one embodiment, a higher-layer signaling is used to indicate that the second signaling comprises the second field.

In one embodiment, the second field comprises one bit.

In one embodiment, the second field is a Priority Indicator field.

In one embodiment, for the specific meaning of the Priority indicator field, refer to section 7.3.1.2 in 3GPP TS38.212.

In one embodiment, the signaling format of the first signaling belongs to a first format set, and the first offset set is related to the first priority; the signaling format of the second signaling belongs to a second format set, and the second offset set is unrelated to the second priority; any signaling format in the first format set does not belong to the second format set.

In one embodiment, the signaling format of the first signaling comprises a usage of the first signaling, and the first offset set is related to the first priority; the signaling format of the second signaling comprises a usage of the second signaling, and the second offset set is unrelated to the second priority; the usage of the first signaling is different from the usage of the second signaling.

In one embodiment, the signaling format of the first signaling is one of 0_0, 0_1 and 0_2, and the signaling format of the second signaling is one of 1_0, 1_1 and 1_2.

In one embodiment, the signaling format of the first signaling is one of 0_0, 0_1 and 0_2, and the signaling format of the second signaling is one of 1_0, 1_1, 1_2, 3_0, and 3_1.

In one embodiment, the signaling format of the first signaling comprises a usage in a first usage set, and the first offset set is related to the first priority; the signaling format of the second signaling comprises a usage of the second usage set, and the second offset set is unrelated to the second priority; any usage in the first usage set does not belong to the second usage set.

In one embodiment, the signaling format of the first signaling is a PUSCH scheduling, and the first offset set is related to the first priority; the signaling format of the second signaling is a PDSCH scheduling, and the second offset set is unrelated to the second priority.

In one embodiment, the signaling format of the first signaling is a PUSCH scheduling, and the first offset set is related to the first priority; the signaling format of the second signaling comprises a CSI triggering, and the second offset set is unrelated to the second priority.

In one embodiment, the signaling format of the first signaling is a first link, and the first offset set is related to the first priority; the signaling format of the first signaling is a second link, and the second offset set is unrelated to the second priority; the first link is different from the second link.

In one embodiment, the signaling format of the first signaling is an uplink, and the signaling format of the second signaling is a downlink.

In one embodiment, the signaling format of the first signaling is an uplink, and the signaling format of the second signaling is a sidelink.

In one embodiment, an interpretation for the first field in the first signaling is related to a signaling format of the first signaling.

In one embodiment, an interpretation for the first field in the second signaling is related to a signaling format of the second signaling.

In one embodiment, the first priority is used for an interpretation for the first field in the first signaling.

In one embodiment, an interpretation for the first field in the second signaling is unrelated to the second priority.

In one embodiment, the first priority is used to determine the first offset set.

In one embodiment, the second priority is not used to determine the second offset set.

In one embodiment, whether the first priority is high or low is used to determine the first offset set.

In one embodiment, the first priority is which of multiple priorities is used to determine the first offset set.

In one embodiment, whether the first priority is a first reference priority or a second reference priority is used to determine the first offset set.

In one embodiment, the second offset set is unrelated to whether the second priority is high or low.

In one embodiment, the second offset set is unrelated to whether the second priority is a first reference priority or a second reference priority.

In one embodiment, the second offset set is unrelated to which of multiple priorities the second priority is.

Embodiment 1B

Figure 1B:
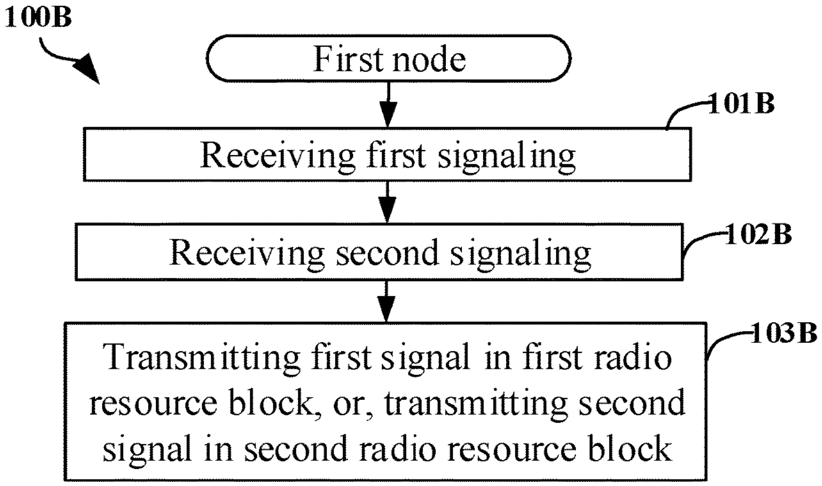
FIG. 1B illustrates a flowchart of a first signaling, a second signaling, a first signal and a second signal according to one embodiment of the present application.

Embodiment 1B illustrates a flowchart of a first signaling, a second signaling, a first signal and a second signal according to one embodiment of the present application, as shown in FIG. 1B. In FIG. 1B, each box represents a step. Particularly, the sequential order of steps in these boxes does not necessarily mean that the steps are chronologically arranged.

In embodiment 1B, the first node in the present application receives a first signaling in step 101B; receives a second signaling in step 102B; transmits a first signal in a first radio resource block in step 103B, or, transmits a second signal in a second radio resource block; herein, the first signaling is used to indicate the first radio resource block; the second signaling is used to indicate the second radio resource block; the first signaling is used to determine a size of a first bit block, the second signaling is used to determine a second bit block, the first signal comprises at least the second sub-signal of a first sub-signal and a second sub-signal, the first sub-signal carries the first bit block, the second sub-signal carries the second bit block, and the second signal carries the second bit block; when a first value is less than a first limit value, the first signal is transmitted in the first radio resource block; when the first value is greater than the first limit value, the second signal is transmitted in the second radio resource block; a number of bit(s) comprised in the second bit block and a first offset are used together to determine the first value, and the first limit value is not greater than a number of RE(s) comprised in the first radio resource block; the first value is a positive integer, the first limit value is a positive integer, and the first offset is a positive integer.

In one embodiment, the first signaling is earlier than the second signaling in time domain.

In one embodiment, a start time for transmitting the first signaling is earlier than a start time for transmitting the second signaling.

In one embodiment, an end time for transmitting the first signaling is earlier than an end time for transmitting the second signaling.

In one embodiment, an end time for transmitting the first signaling is earlier than a start time for transmitting the second signaling.

In one embodiment, the first signaling is an RRC signaling.

In one embodiment, the first signaling is a MAC CE signaling.

In one embodiment, the first signaling is a physical-layer signaling.

In one embodiment, the first signaling is a DCI signaling.

In one embodiment, the first signaling is an uplink grant DCI signaling.

In one embodiment, the first signaling is transmitted on a downlink physical layer control channel (i.e., a downlink channel only capable of carrying a physical-layer signaling).

In one embodiment, the first signaling schedules an SPS transmission.

In one embodiment, the first signaling schedules a configured grant transmission.

In one embodiment, the first signaling comprises a DCI identified by a C-RNTI.

In one embodiment, the first signaling comprises a DCI identified by a CS-RNTI.

In one embodiment, the first signaling schedules a PUSCH.

In one embodiment, the first signaling explicitly indicates the first radio resource block.

In one embodiment, the first signaling implicitly indicates the first radio resource block.

In one embodiment, the first signaling is used to determine a first radio resource block set, the first radio resource block is a radio resource block in the first radio resource block set, and the first radio resource block set comprises multiple mutually-orthogonal radio resource blocks in time domain.

In one embodiment, the first signaling indicates frequency-domain resources occupied by the first radio resource block and time-domain resources occupied by the first radio resource block.

In one embodiment, the first radio resource block comprises time-domain resources and frequency-domain resources.

In one embodiment, the first radio resource block comprises time-domain resources, frequency-domain resources and code-domain resources.

In one embodiment, the first radio resource block comprises a positive integer number of RE(s).

In one embodiment, frequency-domain resources occupied by the first radio resource block comprise a positive integer number of RB(s).

In one embodiment, frequency-domain resources occupied by the first radio resource block comprise a positive integer number of subcarrier(s).

In one embodiment, time-domain resources occupied by the first radio resource block comprises a positive integer number of multicarrier symbol(s).

In one embodiment, time-domain resources occupied by the first radio resource block comprises a positive integer number of single-carrier symbol(s).

In one embodiment, the first radio resource block is reserved for the first bit block.

In one embodiment, the first radio resource block comprises PUSCH resources.

In one embodiment, the resource element is an RE.

In one embodiment, one the RE occupies a multicarrier symbol in time domain, and occupies a subcarrier in frequency domain.

In one embodiment, one the RE occupies a single-carrier symbol in time domain, and occupies a subcarrier in frequency domain.

In one embodiment, the multicarrier symbol is an OFDM symbol.

In one embodiment, the multicarrier symbol is an SC-FDMA symbol.

In one embodiment, the multicarrier symbol is a DFT-S-OFDM symbol.

In one embodiment, the radio resource block comprises time-domain resources and frequency-domain resources.

In one embodiment, the radio resource block comprises time-domain resources, frequency-domain resources and code-domain resources.

In one embodiment, the radio resource block comprises a positive integer number of RE(s).

In one embodiment, the first signaling indicates scheduling information of the first signal.

In one embodiment, the scheduling information of the first signal comprises at least one of occupied time-domain resources, occupied frequency-domain resources, an MCS, configuration information of DMRS, a HARQ process number, an RV or an NDI.

In one subembodiment of the above embodiment, configuration information of the DMRS comprises at least one of an RS sequence, a mapping mode, a DMRS type, occupied time-domain resources, occupied frequency-domain resources, occupied code-domain resources, a cyclic shift, or an OCC.

In one embodiment, the first bit block comprises a positive integer number of bit(s).

In one embodiment, the first bit block comprises a positive integer number of TB(s).

In one embodiment, the first bit block comprises one TB.

In one embodiment, the first bit block comprises a positive integer number of Code Block Group(s) (CBG(s)).

In one embodiment, the first bit block comprises one CBG.

In one embodiment, the size of the first bit block refers to a number of bit(s) comprised in the first bit block.

In one embodiment, the size of the first bit block refers to a Transport Block Size (TBS).

In one embodiment, the size of the first bit block refers to a number of TB(s) comprised in the first bit block.

In one embodiment, the size of the first bit block refers to: a number of CBG(s) comprised in the first bit block.

In one embodiment, the first signaling is used to indicate a size of the first bit block.

In one embodiment, the first signaling implicitly indicates a size of the first bit block.

In one embodiment, the first signaling indicates the first radio resource block and an MCS of the first signal, and a size of the first radio resource block and the MCS of the first signal are used together to determine a size of the first bit block.

In one embodiment, the first signaling indicates the first radio resource block and an MCS of the first signal, a number of RB(s) comprised in the first radio resource block in frequency domain, a number of multicarrier symbol(s) comprised in the first radio resource block in time domain and the MCS of the first signal are used together to determine a size of the first bit block.

In one embodiment, the first signaling indicates frequency-domain resources occupied by the first radio resource block, time-domain resources occupied by the first radio resource block and an MCS of the first signal, the frequency-domain resources occupied by the first radio resource block, the time-domain resources occupied by the first radio resource block and the MCS of the first signal are used together to determine a size of the first bit block.

In one embodiment, the second signaling is dynamically configured.

In one embodiment, the second signaling is a physical-layer signaling.

In one embodiment, the second signaling is a DCI signaling.

In one embodiment, the second signaling is a downlink grant DCI signaling.

In one embodiment, the second signaling is transmitted on a downlink physical-layer control channel (i.e., a downlink channel only capable of bearing a physical-layer signaling).

In one embodiment, the second signaling schedules a PDSCH.

In one embodiment, the second signaling comprises a DCI identified by a C-RNTI.

In one embodiment, the first signaling is used to schedule an uplink transmission, and the second signaling is used to schedule a downlink transmission.

In one embodiment, the first signaling is used to schedule an uplink transmission, and the second signaling is used to schedule a sidelink transmission.

In one embodiment, the second bit block comprises a positive integer number of bit(s).

In one embodiment, the second bit block carries UCI.

In one embodiment, the second bit block carries a HARQ-ACK.

In one embodiment, the second bit block carries an SR.

In one embodiment, the second bit block carries CSI.

In one embodiment, the second bit block carries at least one of an HARQ-ACK, an SR or CSI.

In one embodiment, the CSI comprises at least one of a Channel-state information reference signal Resource Indicator (CRI), a Synchronization Signal/physical broadcast channel Block Resource Indicator (SSBRI), a Layer Indicator (LI), a PMI, a CQI, a Layer 1 Reference Signal Received Power (L1-RSRP), a Layer 1 Reference Signal Received Quality (L1-RSRQ) or a Layer 1 Signal to Interference and Noise Ratio (L1-SINR).

In one embodiment, the second radio resource block comprise time-domain resources and frequency-domain resources.

In one embodiment, the second radio resource block comprise time-domain resources, frequency-domain resources and code-domain resources.

In one embodiment, the second radio resource block comprises a positive integer number of RE(s).

In one embodiment, frequency-domain resources occupied by the first radio resource block comprise a positive integer number of RB(s).

In one embodiment, frequency-domain resources occupied by the first radio resource block comprise a positive integer number of subcarrier(s).

In one embodiment, time-domain resources occupied by the first radio resource block comprises a positive integer number of multicarrier symbol(s).

In one embodiment, time-domain resources occupied by the first radio resource block comprises a positive integer number of single-carrier symbol(s).

In one embodiment, the first radio resource block and the second radio resource block are not orthogonal in time domain.

In one embodiment, the first radio resource block and the second radio resource block are partially or completely overlapped in time domain.

In one embodiment, the second signaling explicitly indicates the second radio resource block.

In one embodiment, the second signaling implicitly indicates the second radio resource block.

In one embodiment, the second radio resource block is reserved for the second bit block.

In one embodiment, the second radio resource block comprises a PUCCH resource.

In one embodiment, the second signaling comprises a third field, and the third field indicates the second radio resource block; the third field of the second signaling comprises a positive integer number of bit(s).

In one subembodiment of the above embodiment, the third field in the second signaling is used to indicate the second radio resource block from a second radio resource block set, the second radio resource block set comprises a positive integer number of radio resource block(s), and the second radio resource block set is indicated by a higher-layer signaling.

In one subembodiment of the above embodiment, the third field in the second signaling is used to indicate an index of the second radio resource block.

In one subembodiment of the above embodiment, the third field in the second signaling comprises a PUCCH resource indicator field.

In one embodiment, for the specific meaning of the PUCCH resource indicator field, refer to 3GPP TS38. 212.

In one embodiment, the first signal comprises the first sub-signal and the second sub-signal.

In one embodiment, the first signal comprises only the second sub-signal in the first sub-signal and the second sub-signal.

In one embodiment, the phrase of the first sub-signal carrying the first bit block comprises: the first bit block is used for generating the first sub-signal.

In one embodiment, the phrase of the first sub-signal carrying the first bit block comprises: the first sub-signal is an output acquired after a bit in the first bit block sequentially through CRC Attachment, Segmentation, Coding block (CB) level CRC Attachment, Channel Coding, Rate Matching, Concatenation, Scrambling, Modulation Mapper, Layer Mapper, transform precoder, Precoding, Resource Element Mapper, multicarrier symbol generation, and Modulation and Upconversion.

In one embodiment, the phrase of the first sub-signal carrying the first bit block comprises: the first sub-signal is an output acquired after a bit in the first bit block is sequentially through CRC Attachment, Segmentation, Coding block (CB) level CRC Attachment, Channel Coding, Rate Matching, Concatenation, Scrambling, Modulation Mapper, Layer Mapper, Precoding, Resource Element Mapper, multicarrier symbol generation, and Modulation and Upconversion.

In one embodiment, the first sub-signal is unrelated to the second bit block.

In one embodiment, the phrase of second sub-signal carrying the second bit block comprises: the second bit block is used to generate the second sub-signal.

In one embodiment, the phrase of second sub-signal carrying the second bit block comprises: the second sub-signal is an output acquired after a bit in the second bit block sequentially through CRC attachment, channel coding, rate matching, a Modulation Mapper, a Layer Mapper, a transform precoder, Precoding, a Resource Element Mapper, Generation of multicarrier symbol, and Modulation and Upconversion.

In one embodiment, the phrase of second sub-signal carrying the second bit block comprises: the second sub-signal is an output acquired after a bit in the second bit block sequentially through CRC Attachment, channel coding, rate matching, a Modulation Mapper, a Layer Mapper, Precoding, a Resource Element Mapper, Generation of multicarrier symbol, and Modulation and Upconversion.

In one embodiment, the second sub-signal is unrelated to the first bit block.

In one embodiment, the first sub-signal and the second sub-signal occupy mutually-orthogonal resource elements within the first radio resource block.

In one embodiment, the phrase of second signal carrying the second bit block comprises: the second bit block is used to generate the second signal.

In one embodiment, the phrase of second signal carrying the second bit block comprises: the second signal is an output acquired after a bit in the second bit block sequentially through CRC attachment, channel coding, rate matching, a Modulation Mapper, a Layer Mapper, a transform precoder, Precoding, a Resource Element Mapper, Generation of multicarrier symbol, and Modulation and Upconversion.

In one embodiment, the phrase of second signal carrying the second bit block comprises: the second signal is an output acquired after a bit in the second bit block sequentially through CRC Attachment, channel coding, rate matching, a Modulation Mapper, a Layer Mapper, Precoding, a Resource Element Mapper, Generation of multicarrier symbol, and Modulation and Upconversion.

In one embodiment, the phrase of second signal carrying the second bit block comprises: the second signal is used to indicate the second bit block.

In one embodiment, the phrase of second signal carrying the second bit block comprises: code-domain resources occupied by the second signal are used to indicate the second bit block.

In one embodiment, the phrase of second signal carrying the second bit block comprises: a preamble of the second signal is used to indicate the second bit block.

Embodiment 2

Figure 2:
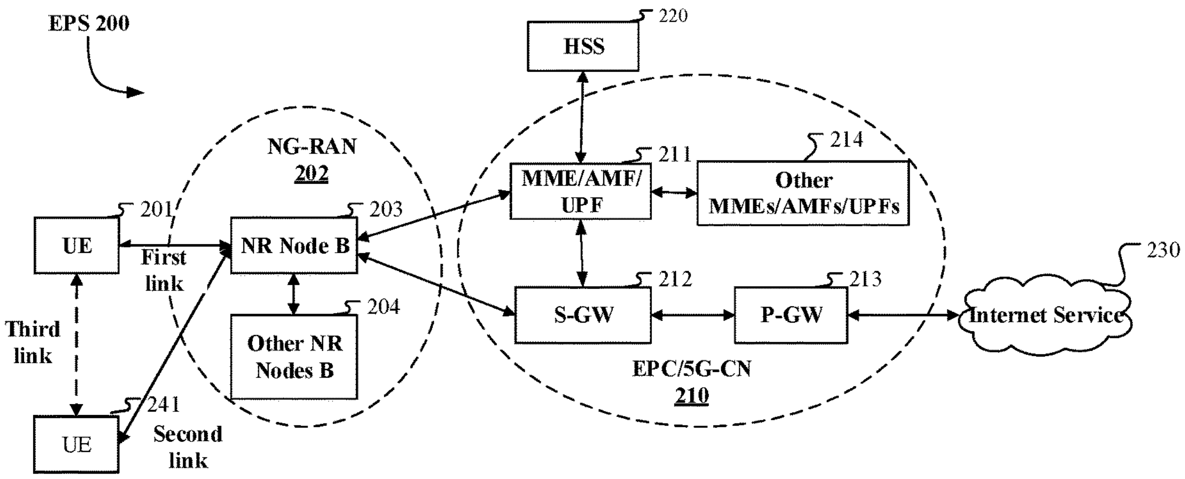
FIG. 2 illustrates a schematic diagram of a network architecture according to one embodiment of the present application.

Embodiment 2 illustrates a schematic diagram of a network architecture according to the present application, as shown in FIG. 2.

FIG. 2 illustrates a network architecture 200 of 5G NR, Long-Term Evolution (LTE) and Long-Term Evolution Advanced (LTE-A) systems. The NR 5G or LTE network architecture 200 may be called an Evolved Packet System (EPS) 200 or other appropriate terms. The EPS 200 may comprise one or more UEs 201, an NG-RAN 202, an Evolved Packet Core/5G-Core Network(EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will readily understand that various concepts presented throughout the present application can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPSs), multimedia devices, video devices, digital audio players (for example, MP3 players), cameras, game consoles, unmanned aerial vehicles (UAV), aircrafts, narrow-band Internet of Things (IoT) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity (MME)/Authentication Management Field(AMF)/User Plane Function (UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 201 corresponds to the first node in the present application.

In one embodiment, the UE 241 corresponds to the second node in the present application.

In one embodiment, the gNB 203 corresponds to the second node in the present application.

Embodiment 3

Figure 3:
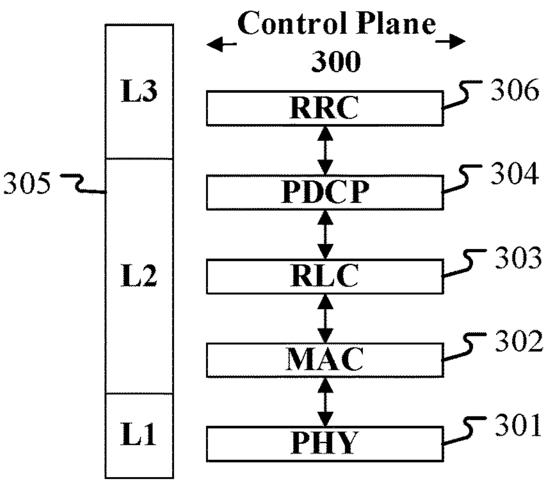
FIG. 3 illustrates a schematic diagram of a radio protocol architecture of a user plane and a control plane according to one embodiment of the present application.

Embodiment 3 illustrates a schematic diagram of an example of a radio protocol architecture of a user plane and a control plane according to one embodiment of the present application, as shown in FIG. 3. FIG. 3 is a schematic diagram illustrating an embodiment of a radio protocol architecture of a user plane 350 and a control plane 300. In FIG. 3, the radio protocol architecture for a first communication node (UE, gNB or an RSU in V2X) and a second communication node (gNB, UE or an RSU in V2X), or between two UEs is represented by three layers, which are a layer 1, a layer 2 and a layer 3, respectively. The layer 1 (L1) is the lowest layer and performs signal processing functions of various PHY layers. The L1 is called PHY 301 in the present application. The layer 2 (L2) 305 is above the PHY 301, and is in charge of a link between a first communication node and a second communication node, as well as two UEs via the PHY 301. L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication node. The PDCP sublayer 304 provides multiplexing among variable radio bearers and logical channels. The PDCP sublayer 304 provides security by encrypting a packet and provides support for a first communication node handover between second communication nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. The Radio Resource Control (RRC) sublayer 306 in layer 3 (L3) of the control plane 300 is responsible for acquiring radio resources (i.e., radio bearer) and configuring the lower layer with an RRC signaling between a second communication node and a first communication node device. The radio protocol architecture of the user plane 350 comprises layer 1 (L1) and layer 2 (L2). In the user plane 350, the radio protocol architecture for the first communication node and the second communication node is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. Although not described in FIG. 3, the first communication node may comprise several higher layers above the L2 layer 355, such as a network layer (e.g., IP layer) terminated at a P-GW of the network side and an application layer terminated at the other side of the connection (e.g., a peer UE, a server, etc.).

In one embodiment, the radio protocol architecture in FIG. 3 is applicable to the first node in the present application.

In one embodiment, the radio protocol architecture in FIG. 3 is applicable to the second node in the present application.

In one embodiment, the first information block in the present application is generated by the RRC sublayer 306.

In one embodiment, the first information block in the present application is generated by the RRC sublayer 306.

In one embodiment, the first information block in the present application is generated by the MAC sublayer 302.

In one embodiment, the first information block in the present application is generated by the MAC sublayer 352.

In one embodiment, the second information block in the present application is generated by the RRC sublayer 306.

In one embodiment, the second information block in the present application is generated by the RRC sublayer 306.

In one embodiment, the second information block in the present application is generated by the MAC sublayer 302.

In one embodiment, the second information block in the present application is generated by the MAC sublayer 352.

In one embodiment, the third information block in the present application is generated by the RRC sublayer 306.

In one embodiment, the third information block in the present application is generated by the RRC sublayer 306.

In one embodiment, the third information block in the present application is generated by the MAC sublayer 302.

In one embodiment, the third information block in the present application is generated by the MAC sublayer 352.

In one embodiment, the first signaling in the present application is generated by the PHY 301.

In one embodiment, the first signaling in the present application is generated by the PHY 351.

In one embodiment, the second signaling in the present application is generated by the PHY 301.

In one embodiment, the second signaling in the present application is generated by the PHY 351.

In one embodiment, the first signal in the present application is generated by the PHY 301.

In one embodiment, the first signal in the present application is generated by the PHY 351.

In one embodiment, the second signal in the present application is generated by the PHY 301.

In one embodiment, the second signal in the present application is generated by the PHY 351.

In one embodiment, the first information block in the present application is generated by the RRC sublayer 306.

In one embodiment, the first information block in the present application is generated by the RRC sublayer 306.

In one embodiment, the first information block in the present application is generated by the MAC sublayer 302.

In one embodiment, the first information block in the present application is generated by the MAC sublayer 352.

In one embodiment, the second information block in the present application is generated by the RRC sublayer 306.

In one embodiment, the second information block in the present application is generated by the RRC sublayer 306.

In one embodiment, the second information block in the present application is generated by the MAC sublayer 302.

In one embodiment, the second information block in the present application is generated by the MAC sublayer 352.

In one embodiment, the first signaling in the present application is generated by the PHY 301.

In one embodiment, the first signaling in the present application is generated by the PHY 351.

In one embodiment, the second signaling in the present application is generated by the PHY 301.

In one embodiment, the second signaling in the present application is generated by the PHY 351.

In one embodiment, the first signal in the present application is generated by the PHY 301.

In one embodiment, the first signal in the present application is generated by the PHY 351.

In one embodiment, the second signal in the present application is generated by the PHY 301.

In one embodiment, the second signal in the present application is generated by the PHY 351.

In one embodiment, the third signal in the present application is generated by the PHY 301.

In one embodiment, the third signal in the present application is generated by the PHY 351.

Embodiment 4

Figure 4:
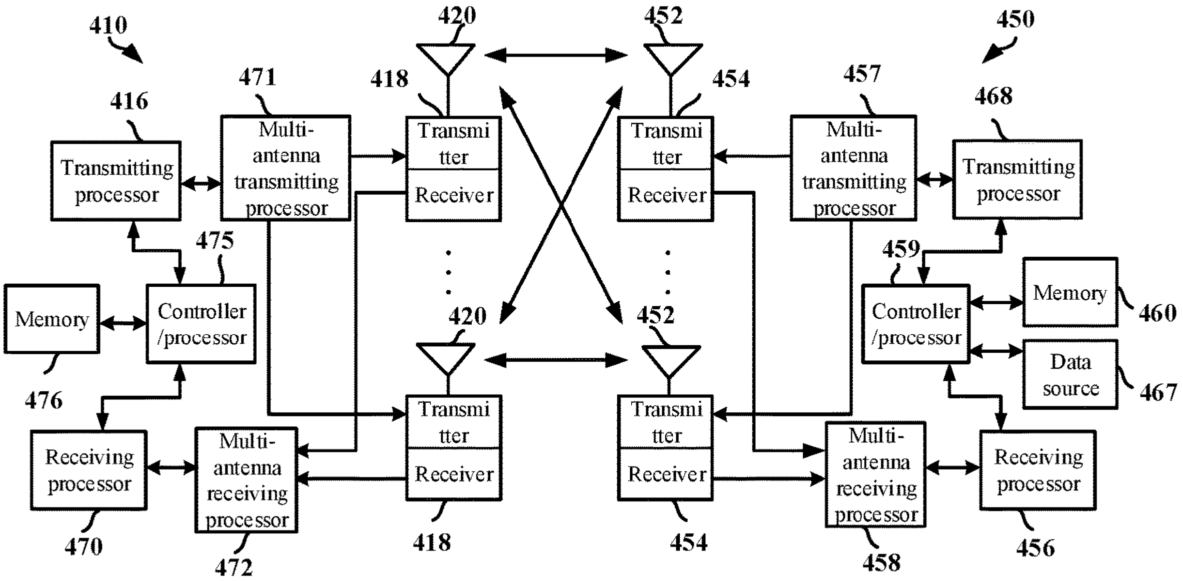
FIG. 4 illustrates a schematic diagram of a first communication device and a second communication device according to one embodiment of the present application.

Embodiment 4 illustrates a schematic diagram of a first communication device and a second communication device in the present application, as shown in FIG. 4. FIG. 4 is a block diagram of a first communication device 410 in communication with a second communication device 450 in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from the core network is provided to a controller/processor 475. The controller/processor 475 provides a function of the L2 layer. In the transmission from the first communication device 410 to the first communication device 450, the controller/processor 475 provides header compression, encryption, packet segmentation and reordering, and multiplexing between a logical channel and a transport channel, and radio resources allocation to the second communication device 450 based on various priorities. The controller/processor 475 is also responsible for retransmission of a lost packet and a signaling to the second communication device 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 450, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multicarrier symbol stream provided by the multi-antenna transmitting processor 471 into a radio frequency (RF) stream. Each radio frequency stream is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any the second communication device-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the first communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In the transmission from the first communication device 410 to the second communication device 450, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in the transmission from the first communication device 410 to the second communication device 450, the controller/processor 459 performs header compression, encryption, packet segmentation and reordering, and multiplexing between a logical channel and a transport channel based on radio resources allocation so as to provide the L2 layer functions used for the user plane and the control plane. The controller/processor 459 is also responsible for retransmission of a lost packet, and a signaling to the first communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In the transmission from the second communication device 450 to the first communication device 410, the controller/processor 475 provides de-multiplexing between a transport channel and a logical channel, packet reassembling, decryption, header decompression, control signal processing so as to recover a higher-layer packet from the UE 450. The higher-layer packet coming from the controller/processor 475 may be provided to the core network.

In one embodiment, the first node in the present application comprises the second communication device 450, and the second node in the present application comprises the first communication device 410.

In one subembodiment of the above embodiment, the first node is a UE, and the second node is a UE.

In one subembodiment of the above embodiment, the first node is a UE, and the second node is a relay node.

In one subembodiment of the above embodiment, the first node is a relay node, and the second node is a UE.

In one subembodiment of the above embodiment, the first node is a UE, and the second node is a base station.

In one subembodiment of the above embodiment, the first node is a relay node, and the second node is a base station.

In one subembodiment of the above embodiment, the second communication device 450 comprises: at least one controller/processor; the at least one controller/processor is responsible for HARQ operation.

In one subembodiment of the above embodiment, the first communication device 410 comprises: at least one controller/processor; the at least one controller/processor is responsible for HARQ operation.

In one subembodiment of the above embodiment, the first communication device 410 comprises: at least one controller/processor; the at least one controller/processor is responsible for error detection using ACK and/or NACK protocols as a way to support HARQ operation.

In one embodiment, the second communication device 450 comprises at least one processor and at least one memory. The at least one memory comprises computer program codes; the at least one memory and the computer program codes are configured to be used in collaboration with the at least one processor. The second communication device 450 at least: receives a first signaling; receives a second signaling; and transmits a first signal in a first radio resource block; herein, the first signaling is earlier than the second signaling in time domain; the first signaling is used to determine the first radio resource block and a size of a first bit block, the second signaling is used to determine a second bit block, a first signal comprises at least the second sub-signal in a first sub-signal and a second sub-signal, the first sub-signal carries the first bit block, and the second sub-signal carries the second bit block; both the first signaling and the second signaling comprises a first field, a value of the first field in the first signaling is used to indicate a first offset from a first offset set, a value of the first field in the second signaling is used to indicate a second offset from a second offset set, only the second offset in the first offset and the second offset is used to determine a number of RE(s) occupied by the second sub-signal in the first radio resource block; the first signaling is used to determine a first priority, the second signaling is used to determine a second priority, a signaling format of the first signaling is used to determine that the first offset set is related to the first priority, a signaling format of the second signaling is used to determine that the second offset set is unrelated to the second priority, and the signaling format of the first signaling is different from the signaling format of the second signaling.

In one subembodiment of the above embodiment, the second communication device 450 corresponds to the first node in the present application.

In one embodiment, the second communication device 450 comprises a memory that stores a computer readable instruction program. The computer readable instruction program generates an action when executed by at least one processor. The action includes: receiving a first signaling; receiving a second signaling; transmitting a first signal in a first radio resource block; herein, the first signaling is earlier than the second signaling in time domain; the first signaling is used to determine the first radio resource block and a size of a first bit block, the second signaling is used to determine a second bit block, a first signal comprises at least the second sub-signal in a first sub-signal and a second sub-signal, the first sub-signal carries the first bit block, and the second sub-signal carries the second bit block; both the first signaling and the second signaling comprises a first field, a value of the first field in the first signaling is used to indicate a first offset from a first offset set, a value of the first field in the second signaling is used to indicate a second offset from a second offset set, only the second offset in the first offset and the second offset is used to determine a number of RE(s) occupied by the second sub-signal in the first radio resource block; the first signaling is used to determine a first priority, the second signaling is used to determine a second priority, a signaling format of the first signaling is used to determine that the first offset set is related to the first priority, a signaling format of the second signaling is used to determine that the second offset set is unrelated to the second priority, and the signaling format of the first signaling is different from the signaling format of the second signaling.

In one subembodiment of the above embodiment, the second communication device 450 corresponds to the first node in the present application.

In one embodiment, the first communication device 410 comprises at least one processor and at least one memory. The at least one memory comprises computer program codes; the at least one memory and the computer program codes are configured to be used in collaboration with the at least one processor. The first communication device 410 at least: transmits a first signaling; transmits a second signaling; and receives a first signal in a first radio resource block; herein, the first signaling is earlier than the second signaling in time domain; the first signaling is used to determine the first radio resource block and a size of a first bit block, the second signaling is used to determine a second bit block, a first signal comprises at least the second sub-signal in a first sub-signal and a second sub-signal, the first sub-signal carries the first bit block, and the second sub-signal carries the second bit block; both the first signaling and the second signaling comprises a first field, a value of the first field in the first signaling is used to indicate a first offset from a first offset set, a value of the first field in the second signaling is used to indicate a second offset from a second offset set, only the second offset in the first offset and the second offset is used to determine a number of RE(s) occupied by the second sub-signal in the first radio resource block; the first signaling is used to determine a first priority, the second signaling is used to determine a second priority, a signaling format of the first signaling is used to determine that the first offset set is related to the first priority, a signaling format of the second signaling is used to determine that the second offset set is unrelated to the second priority, and the signaling format of the first signaling is different from the signaling format of the second signaling.

In one subembodiment of the above embodiment, the first communication device 410 corresponds to the second node in the present application.

In one embodiment, the first communication device 410 comprises a memory that stores a computer readable instruction program. The computer readable instruction program generates an action when executed by at least one processor. The action includes: transmitting a first signaling; transmitting a second signaling; receiving a first signal in a first radio resource block; herein, the first signaling is earlier than the second signaling in time domain; the first signaling is used to determine the first radio resource block and a size of a first bit block, the second signaling is used to determine a second bit block, a first signal comprises at least the second sub-signal in a first sub-signal and a second sub-signal, the first sub-signal carries the first bit block, and the second sub-signal carries the second bit block; both the first signaling and the second signaling comprises a first field, a value of the first field in the first signaling is used to indicate a first offset from a first offset set, a value of the first field in the second signaling is used to indicate a second offset from a second offset set, only the second offset in the first offset and the second offset is used to determine a number of RE(s) occupied by the second sub-signal in the first radio resource block; the first signaling is used to determine a first priority, the second signaling is used to determine a second priority, a signaling format of the first signaling is used to determine that the first offset set is related to the first priority, a signaling format of the second signaling is used to determine that the second offset set is unrelated to the second priority, and the signaling format of the first signaling is different from the signaling format of the second signaling.

In one subembodiment of the above embodiment, the first communication device 410 corresponds to the second node in the present application.

In one embodiment, at least one of the antenna 452, the receiver 454, the multi-antenna receiving processor 458, the receiving processor 456, the controller/processor 459, the memory 460, or the data source 467 is used to receive the first information block and the second information block in the present application.

In one embodiment, at least one of the antenna 420, the transmitter 418, the multi-antenna transmitting processor 471, the transmitting processor 416, the controller/processor 475, or the memory 476 is used to transmit the first information block and the second information block in the present application.

In one embodiment, at least one of the antenna 452, the receiver 454, the multi-antenna receiving processor 458, the receiving processor 456, the controller/processor 459, the memory 460, or the data source 467 is used to receive the third information block in the present application.

In one embodiment, at least one of the antenna 420, the transmitter 418, the multi-antenna transmitting processor 471, the transmitting processor 416, the controller/processor 475, or the memory 476 is used to transmit the third information block in the present application.

In one embodiment, at least one of the antenna 452, the receiver 454, the multi-antenna receiving processor 458, the receiving processor 456, the controller/processor 459, the memory 460, or the data source 467 is used to receive the first signaling in the present application.

In one embodiment, at least one of the antenna 420, the transmitter 418, the multi-antenna transmitting processor 471, the transmitting processor 416, the controller/processor 475, or the memory 476 is used to transmit the first signaling in the present application.

In one embodiment, at least one of the antenna 452, the receiver 454, the multi-antenna receiving processor 458, the receiving processor 456, the controller/processor 459, the memory 460, or the data source 467 is used to receive the second signal in the present application.

In one embodiment, at least one of the antenna 420, the transmitter 418, the multi-antenna transmitting processor 471, the transmitting processor 416, the controller/processor 475, or the memory 476 is used to transmit the second signal in the present application.

In one embodiment, at least one of the antenna 452, the receiver 454, the multi-antenna receiving processor 458, the receiving processor 456, the controller/processor 459, the memory 460, or the data source 467 is used to receive the second signaling in the present application.

In one embodiment, at least one of the antenna 420, the transmitter 418, the multi-antenna transmitting processor 471, the transmitting processor 416, the controller/processor 475, or the memory 476 is used to transmit the second signaling in the present application.

In one embodiment, at least one of the antenna 452, the transmitter 454, the multi-antenna transmitting processor 458, the transmitting processor 468, the controller/processor 459, the memory 460, or the data source 467 is used to transmit the first signal in the present application in the first radio resource block in the present application.

In one embodiment, at least one of the antenna 420, the receiver 418, the multi-antenna receiving processor 472, the receiving processor 470, the controller/processor 475, or the memory 476 is used to receive the first signal in the present application in the first radio resource block in the present application.

In one embodiment, the second communication device 450 comprises at least one processor and at least one memory. The at least one memory comprises computer program codes; the at least one memory and the computer program codes are configured to be used in collaboration with the at least one processor. The second communication device 450 at least: receives a first signaling, the first signaling is used to indicate a first radio resource block; receives a second signaling, the second signaling is used to indicate a second radio resource block; transmits a first signal in the first radio resource block, or, transmits a second signal in the second radio resource block; herein, the first signaling is used to determine a size of a first bit block, the second signaling is used to determine a second bit block, the first signal comprises at least the second sub-signal of a first sub-signal and a second sub-signal, the first sub-signal carries the first bit block, the second sub-signal carries the second bit block, and the second signal carries the second bit block; when a first value is less than a first limit value, the first signal is transmitted in the first radio resource block; when the first value is greater than the first limit value, the second signal is transmitted in the second radio resource block; a number of bit(s) comprised in the second bit block and a first offset are used together to determine the first value, and the first limit value is not greater than a number of RE(s) comprised in the first radio resource block; the first value is a positive integer, the first limit value is a positive integer, and the first offset is a positive integer.

In one subembodiment of the above embodiment, the second communication device 450 corresponds to the first node in the present application.

In one embodiment, the second communication device 450 comprises a memory that stores a computer readable instruction program. The computer readable instruction program generates an action when executed by at least one processor. The action includes: receiving a first signaling, the first signaling being used to indicate a first radio resource block; receiving a second signaling, the second signaling being used to indicate a second radio resource block; transmitting a first signal in the first radio resource block, or, transmitting a second signal in the second radio resource block; herein, the first signaling is used to determine a size of a first bit block, the second signaling is used to determine a second bit block, the first signal comprises at least the second sub-signal of a first sub-signal and a second sub-signal, the first sub-signal carries the first bit block, the second sub-signal carries the second bit block, and the second signal carries the second bit block; when a first value is less than a first limit value, the first signal is transmitted in the first radio resource block; when the first value is greater than the first limit value, the second signal is transmitted in the second radio resource block; a number of bit(s) comprised in the second bit block and a first offset are used together to determine the first value, and the first limit value is not greater than a number of RE(s) comprised in the first radio resource block; the first value is a positive integer, the first limit value is a positive integer, and the first offset is a positive integer.

In one subembodiment of the above embodiment, the second communication device 450 corresponds to the first node in the present application.

In one embodiment, the first communication device 410 comprises at least one processor and at least one memory. The at least one memory comprises computer program codes; the at least one memory and the computer program codes are configured to be used in collaboration with the at least one processor. The first communication device 410 at least: transmits a first signaling, the first signaling is used to indicate a first radio resource block; transmits a second signaling, the second signaling is used to indicate a second radio resource block; receives a first signal in the first radio resource block, or, receives a second signal in the second radio resource block; herein, the first signaling is used to determine a size of a first bit block, the second signaling is used to determine a second bit block, the first signal comprises at least the second sub-signal of a first sub-signal and a second sub-signal, the first sub-signal carries the first bit block, the second sub-signal carries the second bit block, and the second signal carries the second bit block; when a first value is less than a first limit value, the first signal is transmitted in the first radio resource block; when the first value is greater than the first limit value, the second signal is transmitted in the second radio resource block; a number of bit(s) comprised in the second bit block and a first offset are used together to determine the first value, and the first limit value is not greater than a number of RE(s) comprised in the first radio resource block; the first value is a positive integer, the first limit value is a positive integer, and the first offset is a positive integer.

In one subembodiment of the above embodiment, the first communication device 410 corresponds to the second node in the present application.

In one embodiment, the first communication device 410 comprises a memory that stores a computer readable instruction program. The computer readable instruction program generates an action when executed by at least one processor. The action includes: transmitting a first signaling, the first signaling being used to indicate a first radio resource block; transmitting a second signaling, the second signaling being used to indicate a second radio resource block; receiving a first signal in the first radio resource block, or, receiving a second signal in the second radio resource block; herein, the first signaling is used to determine a size of a first bit block, the second signaling is used to determine a second bit block, the first signal comprises at least the second sub-signal of a first sub-signal and a second sub-signal, the first sub-signal carries the first bit block, the second sub-signal carries the second bit block, and the second signal carries the second bit block; when a first value is less than a first limit value, the first signal is transmitted in the first radio resource block; when the first value is greater than the first limit value, the second signal is transmitted in the second radio resource block; a number of bit(s) comprised in the second bit block and a first offset are used together to determine the first value, and the first limit value is not greater than a number of RE(s) comprised in the first radio resource block; the first value is a positive integer, the first limit value is a positive integer, and the first offset is a positive integer.

In one subembodiment of the above embodiment, the first communication device 410 corresponds to the second node in the present application.

In one embodiment, at least one of the antenna 452, the receiver 454, the multi-antenna receiving processor 458, the receiving processor 456, the controller/processor 459, the memory 460 or the data source 467 is used to receive the first information block in the present application.

In one embodiment, at least one of the antenna 420, the transmitter 418, the multi-antenna transmitting processor 471, the transmitting processor 416, the controller/processor 475 or the memory 476 is used to transmit the first information block in the present application.

In one embodiment, at least one of the antenna 452, the receiver 454, the multi-antenna receiving processor 458, the receiving processor 456, the controller/processor 459, the memory 460 or the data source 467 is used to receive the second information block in the present application.

In one embodiment, at least one of the antenna 420, the transmitter 418, the multi-antenna transmitting processor 471, the transmitting processor 416, the controller/processor 475 or the memory 476 is used to transmit the second information block in the present application.

In one embodiment, at least one of the antenna 452, the receiver 454, the multi-antenna receiving processor 458, the receiving processor 456, the controller/processor 459, the memory 460, or the data source 467 is used to receive the first signaling in the present application.

In one embodiment, at least one of the antenna 420, the transmitter 418, the multi-antenna transmitting processor 471, the transmitting processor 416, the controller/processor 475, or the memory 476 is used to transmit the first signaling in the present application.

In one embodiment, at least one of the antenna 452, the receiver 454, the multi-antenna receiving processor 458, the receiving processor 456, the controller/processor 459, the memory 460, or the data source 467 is used to receive the second signaling in the present application.

In one embodiment, at least one of the antenna 420, the transmitter 418, the multi-antenna transmitting processor 471, the transmitting processor 416, the controller/processor 475, or the memory 476 is used to transmit the second signaling in the present application.

In one embodiment, at least one of the antenna 452, the receiver 454, the multi-antenna receiving processor 458, the receiving processor 456, the controller/processor 459, the memory 460, or the data source 467 is used to receive the third signal in the present application.

In one embodiment, at least one of the antenna 420, the transmitter 418, the multi-antenna transmitting processor 471, the transmitting processor 416, the controller/processor 475, or the memory 476 is used to transmit the third signal in the present application.

In one embodiment, at least one of the antenna 452, the transmitter 454, the multi-antenna transmitting processor 458, the transmitting processor 468, the controller/processor 459, the memory 460, or the data source 467 is used to transmit the first signal in the present application in the first radio resource block in the present application.

In one embodiment, at least one of the antenna 420, the receiver 418, the multi-antenna receiving processor 472, the receiving processor 470, the controller/processor 475, or the memory 476 is used to receive the first signal in the present application in the first radio resource block in the present application.

In one embodiment, at least one of the antenna 452, the transmitter 454, the multi-antenna transmitting processor 458, the transmitting processor 468, the controller/processor 459, the memory 460, or the data source 467 is used to transmit the second signal in the present application in the second radio resource block in the present application.

In one embodiment, at least one of the antenna 420, the receiver 418, the multi-antenna receiving processor 472, the receiving processor 470, the controller/processor 475, or the memory 476 is used to receive the second signal in the present application in the second radio resource block in the present application.

Embodiment 5A

Figure 5A:
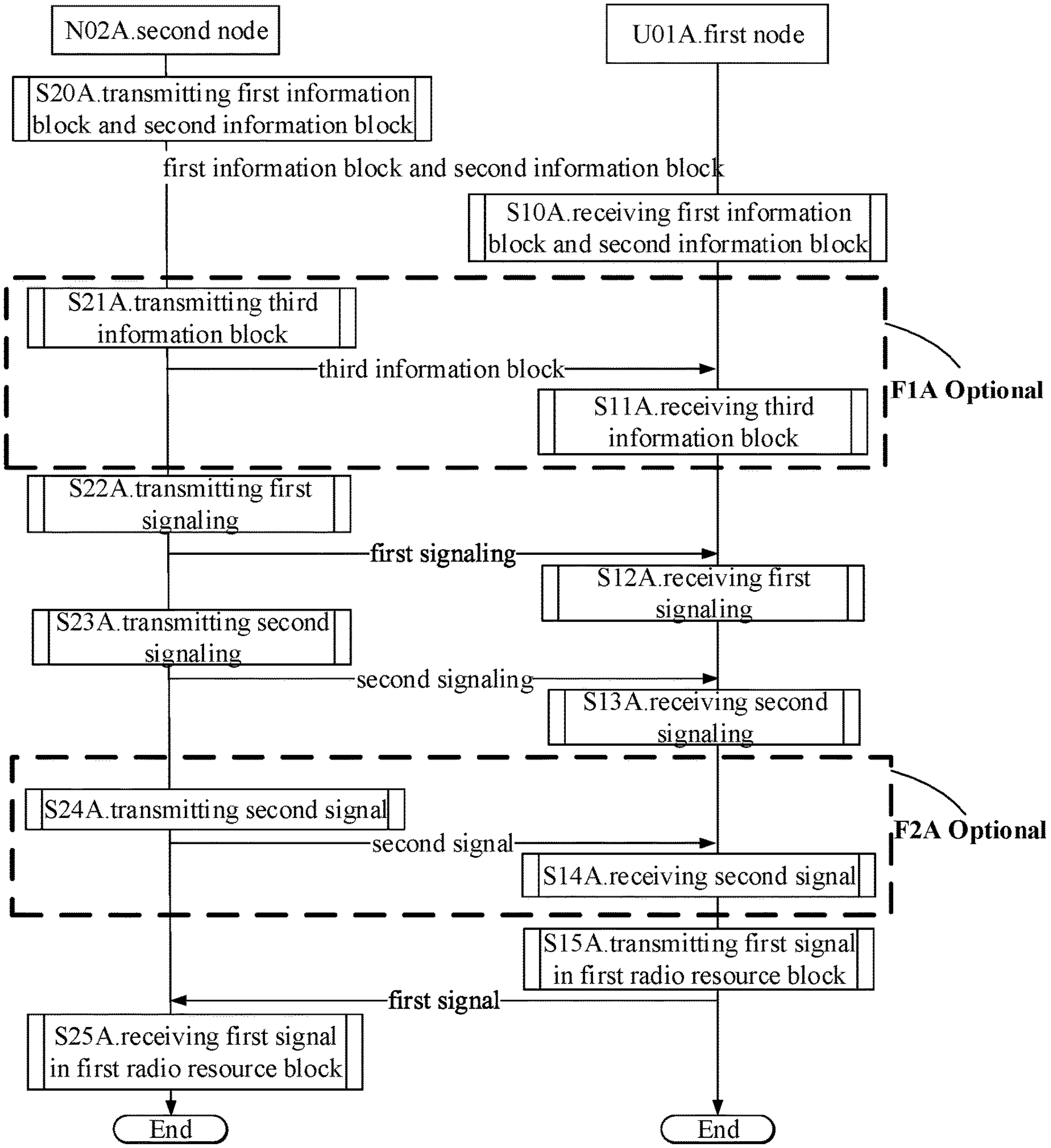
FIG. 5A illustrates a flowchart of radio signal transmission according to one embodiment of the present application.

Embodiment 5A illustrates a flowchart of radio signal transmission according to one embodiment in the present application, as shown in FIG. 5A. In FIG. 5A, a first node U01A and a second node N02A are in communications via an air interface. In FIG. 5A, dotted boxes F1A and F2A are optional.

The first node U01A receives a first information block and a second information block in step S10A; receives a third information block in step S11A; receives a first signaling in step S12A; receives a second signaling in step S13A; receives a second signal in step S14A; and transmits a first signal in a first radio resource block in step S15A.

The second node N02A transmits a first information block and a second information block in step S20A; transmits a third information block in step S21A; transmits a first signaling in step S22A; transmits a second signaling in step S23A; transmits a second signal in step S24A; and receives a first signal in a first radio resource block in step S25A.

In embodiment 5A, the first signaling is earlier than the second signaling in time domain; the first signaling is used to determine the first radio resource block and a size of a first bit block, the second signaling is used by the first node U01A to determine a second bit block, a first signal comprises at least the second sub-signal in a first sub-signal and a second sub-signal, the first sub-signal carries the first bit block, and the second sub-signal carries the second bit block; both the first signaling and the second signaling comprises a first field, a value of the first field in the first signaling is used to indicate a first offset from a first offset set, a value of the first field in the second signaling is used to indicate a second offset from a second offset set, only the second offset in the first offset and the second offset is used by the first node U01A to determine a number of RE(s) occupied by the second sub-signal in the first radio resource block; the first signaling is used by the first node U01A to determine a first priority, the second signaling is used by the first node U01A to determine a second priority, a signaling format of the first signaling is used by the first node U01A to determine that the first offset set is related to the first priority, a signaling format of the second signaling is used by the first node U01A to determine that the second offset set is unrelated to the second priority, and the signaling format of the first signaling is different from the signaling format of the second signaling. The second signaling is used by the first node U01A to determine time-frequency resources occupied by the second signal, and the second bit block is related to the second signal. The first information block is used to indicate the first reference offset set, the second information block is used to indicate the second reference offset set, a first reference priority corresponds to the first reference offset set, and a second reference priority corresponds to the second reference offset set; when the first priority is the first reference priority, the first offset set is the first reference offset set; when the first priority is the second reference priority, the first offset set is the second reference offset set. The third information block is used to indicate the second offset set.

In one embodiment, the second signaling is used to indicate time-frequency resources occupied by the second signal.

In one embodiment, the second signaling indicates time-domain resources and frequency-domain resources occupied by the second signal.

In one embodiment, the second signaling is used to trigger the second signal, and time-frequency resources occupied by the second signal is configured by a higher-layer signaling.

In one embodiment, the second bit block indicates whether the second signal is correctly received.

In one subembodiment of the above embodiment, the second signal carries a positive integer number of Transport Block(s) (TB(s)).

In one subembodiment of the above embodiment, the second signal carries one TB.

In one subembodiment of the above embodiment, the second signal is transmitted on a downlink physical-layer data channel (i.e., a downlink channel capable of carrying physical layer data).

In one subembodiment of the above embodiment, the second bit block comprises a HARQ-ACK feedback for the second signal.

In one subembodiment of the above embodiment, the second signaling is used to indicate time-frequency resources occupied by the second signal.

In one subembodiment of the above embodiment, the second signaling indicates time-domain resources and frequency-domain resources occupied by the second signal.

In one subembodiment of the above embodiment, the second signaling indicates scheduling information of the second signal.

In one subembodiment of the above embodiment, the scheduling information of the second signal comprises at least one of occupied time-domain resources, occupied frequency-domain resources, an MCS, configuration information of DMRS, a HARQ process number, an RV or an NDI.

In one embodiment, the downlink physical-layer data channel is a PDSCH.

In one embodiment, the downlink physical-layer data channel is a short PDSCH (sPDSCH).

In one embodiment, the downlink physical-layer data channel is a Narrow Band PDSCH (NB-PDSCH).

In one embodiment, the second bit block indicates CSI acquired based on a measurement performed on the second signal.

In one subembodiment of the above embodiment, the second signal comprises a reference signal.

In one subembodiment of the above embodiment, the second signaling is used to trigger the second signal, and time-frequency resources occupied by the second signal is configured by a higher-layer signaling.

In one subembodiment of the above embodiment, the second signal comprises a Channel State Information-Reference Signal (CSI-RS).

In one subembodiment of the above embodiment, the second signal comprises a CSI-RS and a CSI-interference measurement resource (CSI-IMR).

In one subembodiment of the above embodiment, the CSI comprises at least one of a Rank indication (RI), a PMI, a CQI, a Csi-reference signal Resource Indicator (CRI) or RSRP.

In one subembodiment of the above embodiment, the second bit block comprises a CSI feedback.

In one subembodiment of the above embodiment, a measurement performed on the second signal comprises a channel measurement, and the channel measurement is used to generate the CSI.

In one subembodiment of the above embodiment, a measurement performed on the second signal comprises an interference measurement, and the interference measurement is used to generate the CSI.

In one subembodiment of the above embodiment, a measurement performed on the second signal comprises a channel measurement and an interference measurement, and the channel measurement and the interference measurement are used to generate the CSI.

In one embodiment, the first information block and the second information block are semi-statically configured.

In one embodiment, the first information block and the second information block are carried by a higher-layer signaling.

In one embodiment, the first information block is carried by an RRC signaling.

In one embodiment, the second information block is carried by an RRC signaling.

In one embodiment, the first information block is carried by a MAC CE signaling.

In one embodiment, the second information block is carried by a MAC CE signaling.

In one embodiment, the first information block and the second information block respectively belong to two IEs in an RRC signaling.

In one embodiment, both the first information block and the second information block belong to a same IE in an RRC signaling.

In one embodiment, the first information block explicitly indicates the first reference offset set.

In one embodiment, the first information block implicitly indicates the first reference offset set.

In one embodiment, the second information block explicitly indicates the second reference offset set.

In one embodiment, the second information block implicitly indicates the second reference offset set.

In one embodiment, the third information block is semi-statically configured.

In one embodiment, the third information block is carried by a higher-layer signaling.

In one embodiment, the third information block is carried by an RRC signaling.

In one embodiment, the third information block is carried by a MAC CE signaling.

In one embodiment, the third information block and the first information block respectively belong to two IEs in an RRC signaling.

In one embodiment, the third information block and the first information block belong to a same IE in an RRC signaling.

In one embodiment, the third information block explicitly indicates the second offset set.

In one embodiment, the third information block implicitly indicates the second offset set.

Embodiment 5B

Figure 5B:
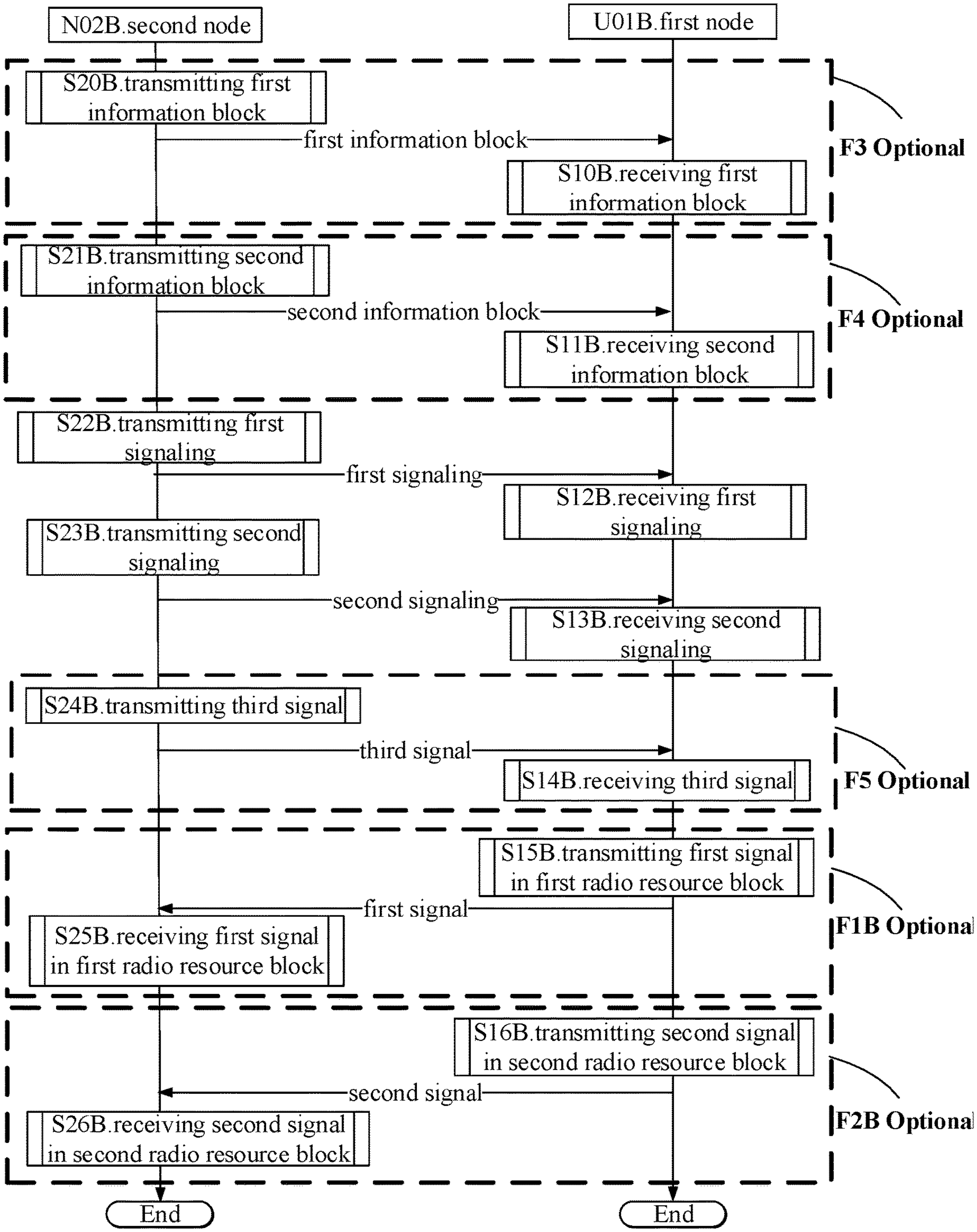
FIG. 5B illustrates a flowchart of radio signal transmission according to one embodiment of the present application.

Embodiment 5B illustrates a flowchart of radio signal transmission according to one embodiment in the present application, as shown in FIG. 5B. In FIG. 5B, a first node U01B and a second node N02B are in communications via an air interface. In FIG. 5B, only one of the dotted boxes FIB and F2B is optional, and the dotted boxes F3, F4 and F5 are optional.

The first node U01B receives a first information block in step S10B; receives a second information block in step S11B; receives a first signaling in step S12B; receives a second signaling in step S13B; receives a third signal in step S14B; transmits a first signal in a first radio resource block in step S15B; and transmits a second signal in a second radio resource block in step S16B.

The second node N02B transmits a first information block in step S20B; transmits a second information block in step S21B; transmits a first signaling in step S22B; transmits a second signaling in step S23B; transmits a third signal in step S24B; receives a first signal in a first radio resource block in step S25B; receives a second signal in a second radio resource block in step S26B.

In embodiment 5B, the first signaling is used to indicate a first radio resource block; the second signaling is used to indicate a second radio resource block; the first signaling is used by the first node U01B to determine a size of a first bit block, the second signaling is used by the first node U01B to determine a second bit block, the first signal comprises at least the second sub-signal of a first sub-signal and a second sub-signal, the first sub-signal carries the first bit block, the second sub-signal carries the second bit block, and the second signal carries the second bit block; when a first value is less than a first limit value, the first signal is transmitted in the first radio resource block; when the first value is greater than the first limit value, the second signal is transmitted in the second radio resource block; a number of bit(s) comprised in the second bit block and a first offset are used together by the first node U01B to determine the first value, and the first limit value is not greater than a number of RE(s) comprised in the first radio resource block; the first value is a positive integer, the first limit value is a positive integer, and the first offset is a positive integer; the first information block is used to indicate the second offset. the second information block is used to indicate a first offset set, the first offset is an offset in the first offset set; the first offset set comprises a positive integer number of offset(s), and any offset in the first offset set is a non-negative real number. The second signaling is used by the first node U01B to determine time-frequency resources occupied by the third signal, and the second bit block is generated for the third signal.

In one embodiment, the dotted box FIB exists, while the dotted box F2B does not exist.

In one embodiment, the dotted box F2B exists, while the dotted box FIB does not exist.

In one embodiment, the first information block is semi-statically configured.

In one embodiment, the first information block is carried by a higher-layer signaling.

In one embodiment, the first information block is carried by an RRC signaling.

In one embodiment, the first information block is carried by a MAC CE signaling.

In one embodiment, the first information block belongs to an IE in an RRC signaling.

In one embodiment, the first information block comprises an IE in an RRC signaling.

In one embodiment, the first information block comprises multiple IEs in an RRC signaling.

In one embodiment, the first information block comprises scaling, and for the specific meaning of the scaling, refer to section 6.3.2 in 3GPP TS38.212.

In one embodiment, the first information block explicitly indicates the second offset.

In one embodiment, the first information block implicitly indicates the second offset.

In one embodiment, the first information block indicates an index of the second offset in a second offset set, and the second offset set comprises a positive integer number of offset(s).

In one subembodiment of the above embodiment, any offset in the second offset set is a positive real number not greater than 1.

In one subembodiment of the above embodiment, any offset in the second offset set is a non-negative real number not greater than 1.

In one embodiment, when the first value is equal to the first limit value, the first signal is transmitted in the first radio resource block.

In one embodiment, when the first value is equal to the first limit value, the second signal is transmitted in the second radio resource block.

In one embodiment, when a first value is less than a first limit value, the first signal is transmitted in the first radio resource block, and a radio signal is dropped to be transmitted in the second radio resource block; when the first value is greater than the first limit value, the second signal is transmitted in the second radio resource block, and a radio signal is dropped to be transmitted in the first radio resource block.

In one embodiment, when the first value is equal to the first limit value, the first signal is transmitted in the first radio resource block, and a radio signal is dropped to be transmitted in the second radio resource block.

In one embodiment, when the first value is equal to the first limit value, the second signal is transmitted in the second radio resource block, and a radio signal is dropped to be transmitted in the second radio resource block.

In one embodiment, the number of RE(s) occupied by the second sub-signal in the first radio resource block is equal to the first value.

In one embodiment, only the first value in the first value and the first limit value is used to determine the number of RE(s) occupied by the second sub-signal in the first radio resource block.

In one embodiment, the first signaling is used to indicate the first offset.

In one embodiment, the first signaling explicitly indicates the first offset.

In one embodiment, the first signaling implicitly indicates the first offset.

In one embodiment, the first signaling is used to indicate the first offset from the first offset set.

In one embodiment, the first signaling comprises a first field, the first field of the first signaling indicates the first offset.

In one subembodiment of the above embodiment, the first field in the first signaling comprises a positive integer number of bit(s).

In one subembodiment of the above embodiment, the first field comprises a beta_offset indicator field.

In one embodiment, for the specific meaning of the beta_offset indicator field, refer to 3GPP TS38.212.

In one embodiment, the second signaling is used to indicate the first offset.

In one embodiment, the second signaling explicitly indicates the first offset.

In one embodiment, the second signaling implicitly indicates the first offset.

In one embodiment, the second signaling is used to indicate the first offset from the first offset set.

In one embodiment, the second signaling comprises a second field, and the second field in the second signaling indicates the first offset.

In one subembodiment of the above embodiment, the second field in the second signaling comprises a positive integer number of bit(s).

In one subembodiment of the above embodiment, the second field in the second signaling comprises a beta_offset indicator field.

In one embodiment, the first offset is a non-negative real number.

In one embodiment, the first offset is a positive real number.

In one embodiment, the first offset is a positive real number greater than 1.

In one embodiment, the first offset is a positive real number not less than 1.

In one embodiment, the first offset is a positive real number not greater than 1.

In one embodiment, the first offset is configured by a higher-layer signaling.

In one embodiment, the first offset is configured via an RRC signaling.

In one embodiment, the first offset is configured by a MAC CE signaling.

In one embodiment, the first offset is a fixed value.

In one embodiment, the first offset is pre-defined.

In one embodiment, the first offset is dynamically determined.

In one embodiment, the first offset is $$\beta_{offset}^{PUSCH}.$$

In one embodiment, for the specific meaning of the $$\beta_{offset}^{PUSCH},$$

refer to section 6.3.2 in 3GPP TS38.212.

In one embodiment, the first offset is $$\beta_{offset}^{HARQ-ACK}.$$

In one embodiment, for the specific meaning of the $$\beta_{offset}^{HARQ-ACK},$$

refer to section 6.3.2 in 3GPP TS38.212.

In one embodiment, the first offset is $$\beta_{offset}^{CSI-1}.$$

In one embodiment, for the specific meaning of the $$\beta_{offset}^{CSI-1},$$

refer to section 6.3.2 in 3GPP TS38.212.

In one embodiment, the first offset is $$\beta_{offset}^{CSI-2}.$$

In one embodiment, for the specific meaning of the $$\beta_{offset}^{CSI-2},$$

refer to section 6.3.2 in 3GPP TS38.212.

In one embodiment, the first offset is $$\beta_{offset}^{AUL-UCI}.$$

In one embodiment, for the specific meaning of the $$\beta_{offset}^{AUL-UCI},$$

refer to section 5.2 in 3GPP TS36.212 (V15.3.0).

In one embodiment, the first offset is $$\beta_{offset}^{CG-UCI}.$$

In one embodiment, for the specific meaning of the $$\beta_{offset}^{CG-UCI},$$

refer to section 6.3.2 in 3GPP TS38.212.

In one embodiment, a product of a number of bit(s) comprised in the second bit block and a first offset is used to determine the first value.

In one embodiment, a target check bit block is generated by a CRC bit block of the second bit block, a number of target bit(s) is a sum of a number of bit(s) comprised in the second bit block and a number of bit(s) comprised in the target check bit block, and a product of the number of target bit(s) and a first offset is used to determine the first value.

In one subembodiment of the above embodiment, the target check bit block is a CRC bit block of the second bit block.

In one subembodiment of the above embodiment, the target check bit block is a bit block acquired after a CRC bit block of the second bit block is scrambled.

In one embodiment, a number of RE(s) comprised in the first radio resource block is used to determine the first limit value.

In one embodiment, the first limit value is equal to a number of RE(s) comprised in the first radio resource block.

In one embodiment, the first limit value is not greater than a number of RE(s) comprised in the first radio resource block.

In one embodiment, a number of RE(s) in the first radio resource block that can be used to transmit control information is used to determine the first limit value.

In one embodiment, the first limit value is equal to a number of RE(s) in the first radio resource block that can be used to transmit control information.

In one embodiment, the first limit value is not greater than a number of RE(s) in the first radio resource block that can be used to transmit control information.

In one embodiment, the first radio resource block comprises a second resource sub-block, and a number of RE(s) comprised in the first radio resource block is used to determine the first limit value.

In one embodiment, the first radio resource block comprises a second resource sub-block, and the first limit value is equal to a number of RE(s) comprised in the second resource sub-block.

In one embodiment, the second information block is semi-statically configured.

In one embodiment, the second information block is carried by a higher-layer signaling.

In one embodiment, the second information block is carried by an RRC signaling.

In one embodiment, the second information block is carried by a MAC CE signaling.

In one embodiment, the second information block belongs to an IE in an RRC signaling.

In one embodiment, the second information block comprises an IEs in an RRC signaling.

In one embodiment, the second information block comprises multiple IEs in an RRC signaling.

In one embodiment, the first offset set comprises more than one offset, and any two offsets in the first offset set are different.

In one embodiment, a number of offset(s) comprised in the first offset set is equal to 1, and the first offset set is the first offset.

In one embodiment, any offset in the first offset set is a positive real number.

In one embodiment, there exists one offset in the first offset set being equal to 0.

In one embodiment, the second information block explicitly indicates a first offset set.

In one embodiment, the second information block implicitly indicates a first offset set.

In one embodiment, the second information block indicates each offset in the first offset set.

In one embodiment, the second signaling is used to indicate time-frequency resources occupied by the third signal.

In one embodiment, the second signaling indicates time-domain resources and frequency-domain resources occupied by the third signal.

In one embodiment, the second signaling is used to trigger the third signal, and time-frequency resources occupied by the third signal are configured by a higher-layer signaling.

In one embodiment, the second bit block indicates whether the third signal is correctly received.

In one subembodiment of the above embodiment, the third signal carries a positive integer number of TB(s).

In one subembodiment of the above embodiment, the third signal carries one TB.

In one subembodiment of the above embodiment, the third signal carries a positive integer number of CBG(s).

In one subembodiment of the above embodiment, the third signal carries one CBG.

In one subembodiment of the above embodiment, the third signal is transmitted on a downlink physical-layer data channel (i.e., a downlink channel capable of carrying physical layer data).

In one subembodiment of the above embodiment, the second bit block comprises a HARQ-ACK feedback for the third signal.

In one subembodiment of the above embodiment, the second signaling is used to indicate time-frequency resources occupied by the third signal.

In one subembodiment of the above embodiment, the second signaling indicates time-domain resources and frequency-domain resources occupied by the third signal.

In one subembodiment of the above embodiment, the second signaling indicates scheduling information of the third signal.

In one subembodiment of the above embodiment, the scheduling information of the third signal comprises at least one of occupied time-domain resources, occupied frequency-domain resources, an MCS, configuration information of DMRS, a HARQ process number, an RV or an NDI.

In one embodiment, the downlink physical-layer data channel is a PDSCH.

In one embodiment, the downlink physical-layer data channel is an sPDSCH.

In one embodiment, the downlink physical-layer data channel is an NB-PDSCH.

In one embodiment, the second bit block indicates CSI acquired based on a measurement performed on the third signal.

In one subembodiment of the above embodiment, the third signal comprises a reference signal.

In one subembodiment of the above embodiment, the second signaling is used to trigger the third signal, and time-frequency resources occupied by the third signal is configured by a higher-layer signaling.

In one subembodiment of the above embodiment, the third signal comprises a CSI-RS.

In one subembodiment of the above embodiment, the third signal comprises a CSI-RS and a CSI-IMR.

In one subembodiment of the above embodiment, the CSI comprises at least one of an RI, a PMI, a CQI, a CRI or an RSRP.

In one subembodiment of the above embodiment, the second bit block comprises a CSI feedback.

In one subembodiment of the above embodiment, a measurement performed on the third signal comprises a channel measurement, and the channel measurement is used to generate the CSI.

In one subembodiment of the above embodiment, a measurement performed on the third signal comprises an interference measurement, and the interference measurement is used to generate the CSI.

In one subembodiment of the above embodiment, a measurement performed on the third signal comprises a channel measurement and an interference measurement, and the channel measurement and the interference measurement are used to generate the CSI.

Embodiment 6A

Figure 6A:
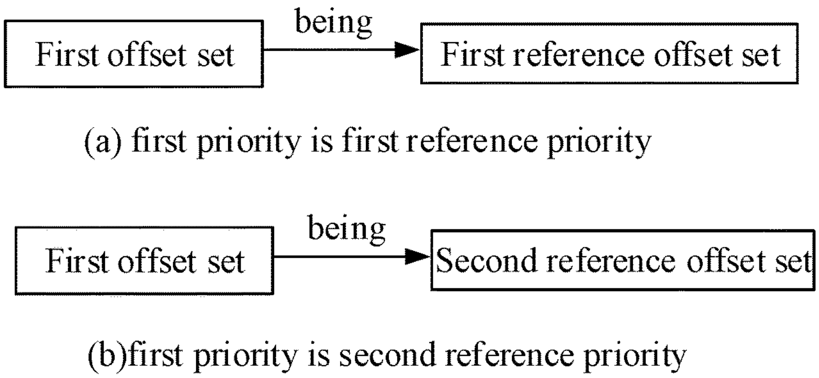
FIG. 6A illustrates a schematic diagram of a relation between a first offset set and a first priority according to one embodiment of the present application.

Embodiment 6A illustrates a schematic diagram of a relation between a first offset set and a first priority, as shown in FIG. 6A.

In embodiment 6A, a first reference priority corresponds to a first reference offset set, and a second reference priority corresponds to a second reference offset set; when the first priority is the first reference priority, the first offset set is the first reference offset set; when the first priority is the second reference priority, the first offset set is the second reference offset set.

In one embodiment, the first reference offset set comprises a positive integer number of offset(s), and any offset in the first reference offset set is a non-negative real number.

In one embodiment, the second reference offset set comprises a positive integer number of offset(s), and any offset in the second reference offset set is a non-negative real number.

In one embodiment, the first reference priority and the second reference priority are different.

In one embodiment, the second reference priority is higher than the first reference priority.

In one embodiment, any offset in the first reference offset set is not less than 1.

In one embodiment, there exists at least one offset less than 1 in the second reference offset set.

In one embodiment, there exists at least one offset not less than 1 in the second reference offset set.

In one embodiment, there at least exists one offset less than 1 and at least one offset not less than 1 in the second reference offset set.

In one embodiment, a priority corresponding to the second reference priority is higher than a priority corresponding to the first reference priority.

In one embodiment, when a value of the second field in the present application is equal to 0, the second field indicates the first reference priority; when a value of the second field is equal to 1, the second field indicates the second reference priority.

Embodiment 6B

Figure 6B:
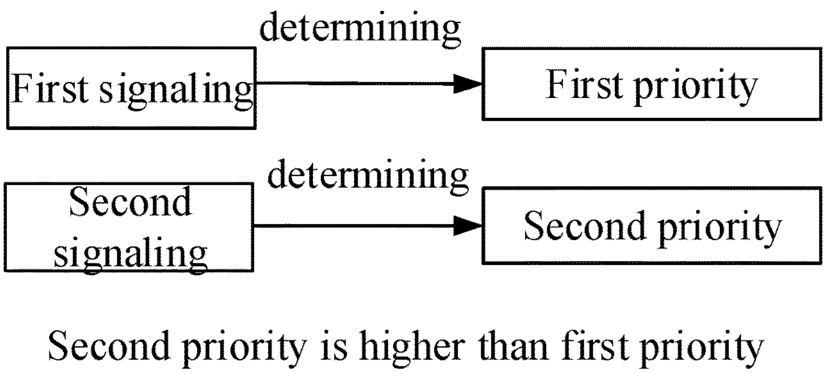
FIG. 6B illustrates a schematic diagram of a first priority and a second priority according to one embodiment of the present application.

Embodiment 6B illustrates a schematic diagram of a first priority and a second priority, as shown in FIG. 6B.

In embodiment 6, the first signaling in the present application is used to determine a first priority, the second signaling in the present application is used to determine a second priority, the second priority being higher than the first priority.

In one embodiment, the first priority is a low priority, and the second priority is a high priority.

In one embodiment, the second priority is a priority higher than the first priority.

In one embodiment, the first priority is a priority less than the second priority.

In one embodiment, the second priority is different from the first priority.

In one embodiment, a signaling identifier of the first signaling is used to determine a first priority.

In one embodiment, a signaling identifier of the second signaling is used to determine a second priority.

In one embodiment, the first priority is a priority of the first sub-signal.

In one embodiment, the first priority is a priority of the first bit block.

In one embodiment, the second priority is a priority of the third signal.

In one embodiment, the second priority is a priority of the second bit block.

In one embodiment, the first priority is configured by a higher-layer signaling.

In one embodiment, the second priority is configured by a higher-layer signaling.

In one embodiment, the first signaling carries a first identifier, and the first identifier is used to determine whether a first priority is configured by a higher-layer signaling or indicated by the first signaling.

In one embodiment, the second signaling carries a second identifier, and the second identifier is used to determine whether the second priority is configured by a higher-layer signaling or indicated by the second signaling.

In one embodiment, the first signaling carries a first identifier; when the first identifier belongs to a first identifier set, the first priority is configured by a higher-layer signaling; when the first identifier belongs to a second identifier set, the first priority is indicated by the first signaling.

In one embodiment, the second signaling carries a second identifier; when the second identifier belongs to a first identifier set, the second priority is configured by a higher-layer signaling; when the second identifier belongs to a second identifier set, the second priority is indicated by the first signaling.

In one embodiment, the first identifier set comprises a CS-RNTI.

In one embodiment, the second identifier set comprises a C-RNTI.

In one embodiment, the second identifier set comprises an MCS-C-RNTI.

In one embodiment, any identifier in the first identifier set does not belong to the second identifier set.

In one embodiment, any of the first identifier set and the second identifier set is an RNTI.

In one embodiment, any of the first identifier set and the second identifier set is a non-negative integer.

In one embodiment, any of the first identifier set and the second identifier set is a signaling identifier of a DCI signaling.

In one embodiment, any signaling in the first identifier set and the second identifier set is used to generate an RS sequence of a DMRS of a DCI signaling.

In one embodiment, any identifier in the first identifier set and the second identifier set is used to scramble a CRC bit sequence of a DCI signaling.

In one embodiment, the first identifier is a non-negative integer.

In one embodiment, the first identifier is a signaling identifier of the first signaling.

In one embodiment, the first identifier is used to generate an RS sequence of a DMRS of the first signaling.

In one embodiment, a CRC bit sequence of the first signaling is scrambled by the first identifier.

In one embodiment, the second identifier is a non-negative integer.

In one embodiment, the second identifier is a signaling identifier of the second signaling.

In one embodiment, the second identifier is used to generate an RS sequence of a DMRS of the second signaling.

In one embodiment, a CRC bit sequence of the second signaling is scrambled by the second identifier.

In one embodiment, the first signaling schedules an SPS transmission, a higher-layer signaling indicates configuration information of the SPS transmission, and configuration information of the SPS transmission comprises the first priority.

In one embodiment, the first signaling schedules a configured grant transmission, a higher-layer signaling indicates configuration information of the configured grant transmission, and configuration information of the configuration grant transmission comprises the first priority.

In one embodiment, the second signaling schedules an SPS transmission, an RRC signaling indicates configuration information of the SPS transmission, and configuration information of the SPS transmission comprises the second priority.

In one embodiment, a signaling identifier of the first signaling is an RNTI, and a signaling identifier of the second signaling is an RNTI.

In one embodiment, a signaling identifier of the first signaling is a non-negative integer, and a signaling identifier of the second signaling is a non-negative integer.

In one embodiment, a signaling identifier of the first signaling is used to generate an RS sequence of a DMRS of the first signaling, and a signaling identifier of the second signaling is used to generate an RS sequence of a DMRS of the first signaling.

In one embodiment, a signaling identifier of the first signaling is used to scramble a CRC bit sequence of a DCI signaling, and a signaling identifier of the second signaling is used to scramble a CRC bit sequence of a DCI signaling.

In one embodiment, the first signaling is used to indicate a first priority.

In one embodiment, the second signaling is used to indicate a second priority.

In one embodiment, the first signaling explicitly indicates a first priority.

In one embodiment, the second signaling explicitly indicates a second priority.

In one embodiment, the first signaling implicitly indicates a first priority.

In one embodiment, the second signaling implicitly indicates a second priority.

In one embodiment, the first signaling comprises a fourth field, the fourth field in the first signaling indicates a first priority, and the fourth field in the first signaling comprises a positive integer number of bit(s).

In one embodiment, a higher-layer signaling is used to indicate that the first signaling comprises the fourth field.

In one embodiment, the second signaling comprises a fourth field, the fourth field in the second signaling indicates a second priority, and the fourth field in the second signaling comprises a positive integer number of bit(s).

In one embodiment, a higher-layer signaling is used to indicate that the second signaling comprises the fourth field.

In one embodiment, the fourth field comprises one bit.

In one embodiment, the fourth field is a Priority Indicator field.

In one embodiment, for the specific meaning of the Priority indicator field, refer to section 7.3.1.2 in 3GPP TS38.212.

Embodiment 7A

Figure 7A:
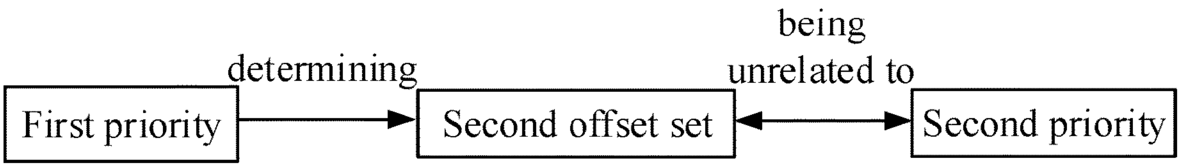
FIG. 7A illustrates a schematic diagram of a relation between a second offset set and a first priority, a second priority according to one embodiment of the present application.

Embodiment 7A illustrates a schematic diagram of a relation between a second offset set and a first priority, a second priority, as shown in FIG. 7A.

In embodiment 7A, the first priority in the present application is used to determine the second offset set.

In one embodiment, whether the first priority is high or low is used to determine the second offset set.

In one embodiment, the first priority is which of multiple priorities is used to determine the second offset set.

In one embodiment, whether the first priority is a first reference priority or a second reference priority is used to determine the second offset set.

In one embodiment, the first priority is used for an interpretation for the first field in the second signaling.

In one embodiment, the second offset set is the same as the first offset set.

In one embodiment, a first reference priority corresponds to the first reference offset set, and a second reference priority corresponds to the second reference offset set; when the first priority is the first reference priority, the second offset set is the first reference offset set; when the first priority is the second reference priority, the second offset set is the second reference offset set.

Embodiment 7B

Figure 7B:
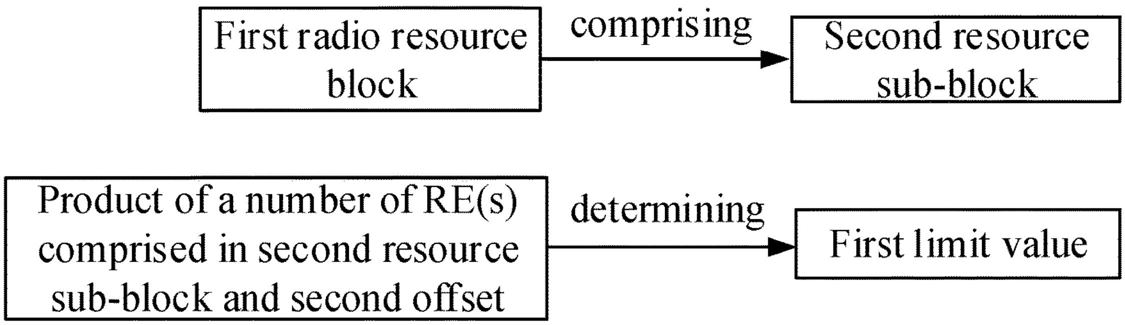
FIG. 7B illustrates a schematic diagram of a first limit value according to one embodiment of the present application.

Embodiment 7B illustrates a schematic diagram of a first limit value, as shown in FIG. 7B.

In embodiment 7B, the first radio resource block in the present application comprises a second resource sub-block, a product of a number of RE(s) comprised in the second resource sub-block and a second offset is used to determine the first limit value, and the second offset is a positive integer not greater than 1.

In one embodiment, the first radio resource block only comprises a second resource sub-block.

In one embodiment, the second resource sub-block is the first radio resource block.

In one embodiment, the first radio resource block comprises a second resource sub-block and a fourth resource sub-block, and the second resource sub-block is orthogonal to the fourth resource sub-block.

In one subembodiment of the above embodiment, the fourth resource sub-block comprises a multicarrier symbol reserved for a DMRS in time domain.

In one subembodiment of the above embodiment, the fourth resource sub-block comprises at least a former of all REs on a multicarrier symbol reserved for a DMRS and RE(s) occupied by a Phase Tracking Reference Signal (PTRS).

In one subembodiment of the above embodiment, the fourth resource sub-block comprises all REs on a multicarrier symbol reserved for a DMRS and RE(s) occupied by a PTRS.

In one subembodiment of the above embodiment, any RE in the second resource sub-block does not belong to a fourth resource sub-block.

In one subembodiment of the above embodiment, the second resource sub-block and the fourth resource sub-block are non-overlapping.

In one subembodiment of the above embodiment, only the second resource sub-block in the second resource sub-block and the fourth resource sub-block may be used to transmit control information.

In one embodiment, the second offset is a fixed value.

In one embodiment, the second offset is equal to 1.

In one embodiment, the second offset is a positive real number not greater than 1.

In one embodiment, the second offset is pre-defined.

In one embodiment, the second offset is configurable.

In one embodiment, the second offset is configured by a higher-layer signaling.

In one embodiment, the second offset is configured by an RRC signaling.

In one embodiment, the second offset is configured by a MAC CE signaling.

In one embodiment, the first signaling is used to indicate the second offset.

In one embodiment, the first signaling explicitly indicates the second offset.

In one embodiment, the first signaling implicitly indicates the second offset.

In one embodiment, the second signaling is used to indicate the second offset.

In one embodiment, the second signaling explicitly indicates the second offset.

In one embodiment, the second signaling implicitly indicates the second offset.

In one embodiment, the second offset is a, for the specific meaning of the a, refer to section 6.3.2.4 in 3GPP TS38.212.

In one embodiment, the first limit value is a positive integer not less than a product of a number of RE(s) comprised in the second resource sub-block and a second offset.

In one embodiment, the first limit value is equal to a product of a number of RE(s) comprised in the second resource sub-block and a second offset rounded up to an integer.

In one embodiment, the first limit value is a minimum positive integer not less than a product of a number of RE(s) comprised in the second resource sub-block and a second offset.

In one embodiment, the first limit value is linearly correlated with a second limit value, and the second limit value is a number of RE(s) comprised in the second resource sub-block and a second offset is used to determine the second limit value.

In one embodiment, the first limit value is linearly correlated with a second limit value, and the second limit value is acquired after a product of a number of RE(s) comprised in the second resource sub-block and a second offset rounded up to an integer.

In one embodiment, the first limit value is linearly correlated with a second limit value, and the second limit value is a minimum positive integer not less than a product of a number of RE(s) comprised in the second resource sub-block and a second offset.

In one embodiment, the first limit value is not greater than the second limit value.

In one embodiment, a linearly correlated coefficient between the first limit value and a second limit value is a positive real number.

In one embodiment, a linearly correlated coefficient between the first limit value and a second limit value is 1.

In one embodiment, a number of RE(s) comprised in the second resource sub-block is $$\sum_{l=l_0}^{N_{symb,all}^{PUSCH}-1} M_{sc}^{UCI}(l),$$

the second offset is α, the first limit value is $$\left\lceil \alpha \sum_{l=l_0}^{N_{symb,all}^{PUSCH}-1} M_{sc}^{UCI}(l) \right\rceil,$$

where α is a higher layer parameter scaling, the $l_0$ is an index of a first multicarrier symbol not comprising a DMRS occupied by a PUSCH, $$N_{symb,all}^{PUSCH}$$

is a number of multicarrier symbol(s) occupied by a PUSCH, the $$M_{sc}^{UCI}(l)$$

is a number of RE(s) that can be occupied by UCI on an l-th multicarrier symbol. The first signal in the present application is transmitted on the PUSCH. For specific meanings of the a $$\left\lceil \alpha \sum_{l=l_0}^{N_{symb,all}^{PUSCH}-1} M_{sc}^{UCI}(l) \right\rceil,$$

the α, the $l_0$, the $$N_{symb,all}^{PUSCH}$$

and the $$M_{sc}^{UCI}(l)$$

refer to section 6.3.2.4 in 3GPP TS38.212.

In one embodiment, a number of RE(s) comprised in the second resource sub-block is $$\sum_{l=0}^{N_{symb,all}^{PUSCH}-1} M_{sc}^{UCI}(l),$$

the second offset is α, the first limit value is $$\left\lceil \alpha \sum_{l=0}^{N_{symb,all}^{PUSCH}-1} M_{sc}^{UCI}(l) \right\rceil - Q'_{ACK},$$

the $Q'_{ACK}$ is a number of RE(s) occupied by a HARQ-ACK. For the specific meanings of the $$\left\lceil \alpha \sum_{l=0}^{N_{symb,all}^{PUSCH}-1} M_{sc}^{UCI}(l) \right\rceil - Q'_{ACK},$$

the α, the $$N_{symb,all}^{PUSCH},$$

the $$M_{sc}^{UCI}(l)$$

and the $Q'_{ACK}$, refer to section 6.3.2.4, 3GPP TS38.212.

In one embodiment, a number of RE(s) comprised in the second resource sub-block is $$\sum_{l=0}^{N_{symb,all}^{PUSCH}-1} M_{sc}^{UCI}(l),$$

the second offset is 1, the first limit value is $$\sum_{l=0}^{N_{symb,all}^{PUSCH}-1} M_{sc}^{UCI}(l) - Q'_{ACK}.$$

For the specific meanings of the $$\left\lceil \sum_{l=0}^{N_{symb,all}^{PUSCH}-1} M_{sc}^{UCI}(l) \right\rceil - Q'_{ACK},$$

the $$N_{symb,all}^{PUSCH},$$

the $$M_{sc}^{UCI}(l)$$

and the $Q'_{ACK}$, refer to section 6.3.2.4 in 3GPP TS38.212.

In one embodiment, a number of RE(s) comprised in the second resource sub-block is $$\sum_{l=0}^{N_{symb,all}^{PUSCH}-1} M_{sc}^{UCI}(l),$$

the second offset is α, the first limit value is $$\left\lceil \alpha \sum_{l=0}^{N_{symb,all}^{PUSCH}-1} M_{sc}^{UCI}(l) \right\rceil - Q'_{ACK} - Q'_{CSI-1},$$

and the $Q'_{CSI-1}$ is a number of RE(s) occupied by CSI part 1. For the specific meanings of the $$\left\lceil \alpha \sum_{l=0}^{N_{symb,all}^{PUSCH}-1} M_{sc}^{UCI}(l) \right\rceil - Q'_{ACK} - Q'_{CSI-1},$$

the α, the $$N_{symb,all}^{PUSCH},$$

the $$M_{sc}^{UCI}(l),$$

the $Q'_{ACK}$ and the $Q'_{CSI-1}$, refer to section 6.3.2.4 in 3GPP TS38.212.

In one embodiment, a number of RE(s) comprised in the second resource sub-block is $$M_{sc}^{PUSCH}\cdot N_{symb}^{PUSCH},$$

the second offset is 1, the first limit value is M $$M_{sc}^{PUSCH}\cdot N_{symb}^{PUSCH},$$

the $$M_{sc}^{PUSCH}$$

is a bandwidth configured by a latest AUL activation DCI, and the $$N_{symb}^{PUSCH}$$

is a number of multicarrier symbol(s) allocated to a PUSCH. The first signal in the present application is transmitted on the PUSCH. For the specific meanings of the $$M_{sc}^{PUSCH}$$

and the $$N_{symb}^{PUSCH},$$

refer to section 5.2.2 in 3GPP TS36.212.

Embodiment 8A

Figure 8A:
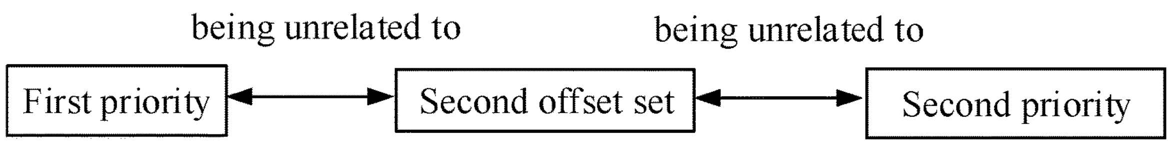
FIG. 8A illustrates a schematic diagram of a relation between a second offset set and a first priority, a second priority according to another embodiment of the present application.

Embodiment 8A illustrates another schematic diagram of a relation between a second offset set and a first priority, a second priority, as shown in FIG. 8A.

In embodiment 8A, the second offset set is unrelated to the first priority in the present application.

In one embodiment, the second offset set is unrelated to whether the first priority is high or low.

In one embodiment, the second offset set is unrelated to whether the first priority is a first reference priority or a second reference priority.

In one embodiment, the second offset set is unrelated to which of multiple priorities the first priority is.

In one embodiment, neither the first priority nor the second priority is used for an interpretation for the first field in the second signaling.

In one embodiment, an interpretation for the first field in the second signaling is unrelated to both the first priority and the second priority.

In one embodiment, neither the first priority nor the second priority is used to determine the second offset set.

In one embodiment, the second offset set is configured by a higher-layer signaling.

In one embodiment, the first reference offset set and the second reference offset set are used to generate the second offset set.

In one embodiment, the second offset set consists of all different offsets in the first reference offset set and the second reference offset set.

In one embodiment, the second offset set comprises all different offsets in the first reference offset set and the second reference offset set.

In one embodiment, the second offset set is unrelated to both the first reference offset set and the second reference offset set.

In one embodiment, the second offset set, the first reference offset set and the second reference offset set are respectively and independently configured.

In one embodiment, there exists at least one offset less than 1 in the second offset set.

In one embodiment, there exists at least one offset not less than 1 in the second offset set.

In one embodiment, there at least exists one offset less than 1 and at least one offset not less than 1 in the second offset set.

Embodiment 8B

Figure 8B:
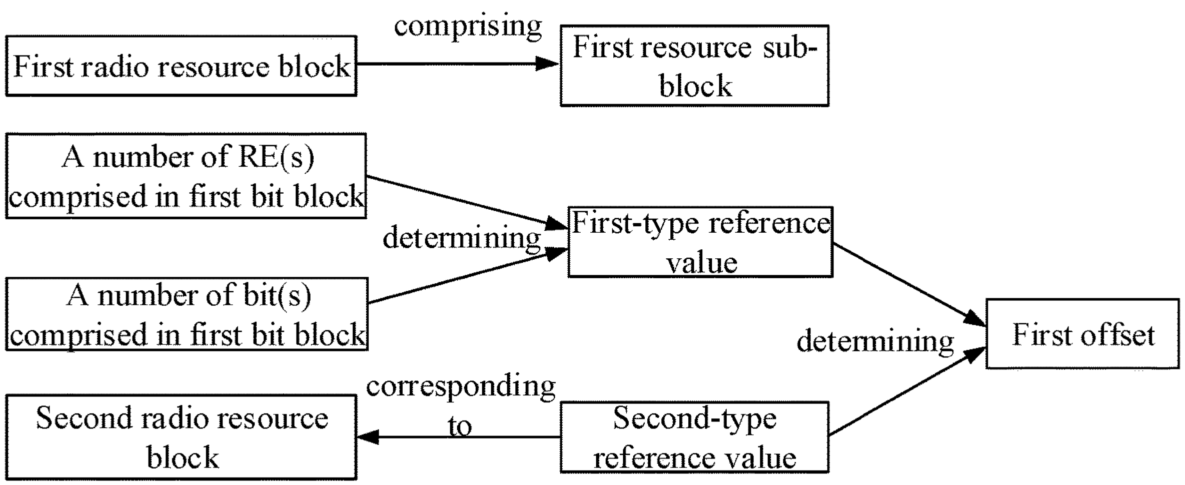
FIG. 8B illustrates a schematic diagram of a first offset according to one embodiment of the present application.

Embodiment 8B illustrates a schematic diagram of a first offset, as shown in FIG. 8B.

In embodiment 8B, the first radio resource block in the present application comprises a first resource sub-block, and a number of RE(s) comprised in the first resource sub-block and a number of bit(s) comprised in the first bit block in the present application are used to determine a first-type reference value; a second-type reference value corresponds to the second radio resource block in the present application, and the second-type reference value is not greater than a maximum code rate of the second radio resource block; the first reference value and the second-type reference value are used together to determine the first offset.

In one embodiment, the first resource sub-block is the same as the second resource sub-block.

In one embodiment, the first resource sub-block is different from the second resource sub-block.

In one embodiment, the first radio resource block only comprises a first resource sub-block.

In one embodiment, the first resource sub-block is the first radio resource block.

In one embodiment, the first radio resource block comprises a first resource sub-block and a third resource sub-block, and the first resource sub-block is orthogonal to the third resource sub-block.

In one subembodiment of the above embodiment, the third resource sub-block comprises a multicarrier symbol reserved for a DMRS in time domain.

In one subembodiment of the above embodiment, the third resource sub-block comprises at least a former of all REs on a multicarrier symbol reserved for a DMRS and RE(s) occupied by a PTRS.

In one subembodiment of the above embodiment, the third resource sub-block comprises all REs on a multicarrier symbol reserved for a DMRS and an RE occupied by a PTRS.

In one subembodiment of the above embodiment, any RE in the first resource sub-block does not belong to the third resource sub-block.

In one subembodiment of the above embodiment, the first resource sub-block and the third resource sub-block are non-overlapping.

In one subembodiment of the above embodiment, only the first resource sub-block in the first resource sub-block and the third resource sub-block may be used to transmit control information.

In one subembodiment of the above embodiment, the third resource sub-block is the same as the fourth resource sub-block in the present application.

In one subembodiment of the above embodiment, the third resource sub-block is different from the fourth resource sub-block in the present application.

In one embodiment, the first-type reference value is a positive real number.

In one embodiment, the first-type reference value is acquired by dividing a number of RE(s) comprised in the first resource sub-block by a number of bit(s) comprised in the first bit block.

In one embodiment, the first-type reference value is equal to $$\frac{\sum_{l=0}^{N_{symb,all}^{PUSCH}-1} M_{sc}^{UCI}(l)}{\sum_{r=0}^{C_{UL-SCH}-1} K_r},$$

the $C_{UL-SCH}$ is a number of code block(s) comprised in a PUSCH, the $K_r$ is a number of bit(s) comprised in an r-th code block, the $$N_{symb,all}^{PUSCH}$$

is a number of multicarrier symbol(s) occupied by a PUSCH, and the $$M_{sc}^{UCI}(l)$$

is a number of RE(s) occupied by UCI on an l-th multicarrier symbol. The first signal in the present application is transmitted on the PUSCH. For the specific meanings of the $$\frac{\sum_{l=0}^{N_{symb,all}^{PUSCH}-1} M_{sc}^{UCI}(l)}{\sum_{r=0}^{C_{UL-SCH}-1} K_r},$$

the $C_{UL-SCH}$, the $K_r$, the $$N_{symb,all}^{PUSCH}$$

and the $$M_{sc}^{UCI}(l),$$

refer to section 6.3.2.4 in 3GPP TS38.212.

In one embodiment, the first-type reference value is equal to $$\frac{1}{R \cdot Q_m},$$

the R is a code rate of a PUSCH, and the $Q_m$ is a modulation order of a PUSCH. The first signal in the present application is transmitted on the PUSCH. For specific meanings of the $$\frac{1}{R \cdot Q_m},$$

the R and the $Q_m$, refer to section 6.3.2.4 in 3GPP TS38.212.

In one embodiment, the first reference value is equal to $$\frac{M_{sc}^{PUSCH-initial(x)} N_{symb}^{PUSCH-initial(x)}}{\sum_{r=0}^{C^{(x)}-1} K_r^{(x)}},$$

the x is an index of a TB block corresponding to a largest $I_{MCS}$ among TB blocks carried by a PUSCH, the $C^{(x)}$ is a number of code block(s) comprised in a TB block indexed as x, the $$K_r^{(x)}$$

is a number of bit(s) comprised in an r-th code block of a TB block indexed as x, the $$M_{sc}^{PUSCH\text{-}initial(x)}$$

is a number of multicarrier symbol(s) occupied by a first transmission of a TB block indexed as x, the $$N_{symb}^{PUSCH\text{-}initial(x)}$$

is a bandwidth occupied by a first transmission of a TB block indexed as x. The first signal in the present application is transmitted on the PUSCH. For specific meanings of the $$\frac{M_{sc}^{PUSCH-initial(x)} N_{symb}^{PUSCH-initial(x)}}{\sum_{r=0}^{C^{(x)}-1} K_r^{(x)}},$$

the x, the $C^{(x)}$, the $$K_r^{(x)},$$

the $$M_{sc}^{PUSCH\text{-}initial(x)}$$

and the $$N_{symb}^{PUSCH\text{-}initial(x)},$$

refer to section 5.2.2 in 3GPP TS36.212.

In one embodiment, the meaning of the phrase of a second-type reference value corresponding to the second radio resource block comprises: the second-type reference value is a maximum code rate on the second radio resource block.

In one embodiment, the meaning of the phrase of a second-type reference value corresponding to the second radio resource block comprises: the second-type reference value is a maximum code rate for transmitting control information on the second radio resource block.

In one embodiment, the meaning of the phrase of a second-type reference value corresponding to the second radio resource block comprises: the second-type reference value is a code rate of the second signal.

In one embodiment, the meaning of the phrase of a second-type reference value corresponding to the second radio resource block comprises: a code rate of the second signal is not greater than the second-type reference value.

In one embodiment, the meaning of the phrase of a second-type reference value corresponding to the second radio resource block comprises: the second-type reference value is not greater than a maximum code rate corresponding to the second radio resource block.

In one embodiment, the meaning of the phrase of a second-type reference value corresponding to the second radio resource block comprises: configuration information of the second radio resource block comprises a maximum code rate of the second radio resource block, and the second-type reference value is not greater than a maximum code rate of the second radio resource block.

In one embodiment, the meaning of the phrase of a second-type reference value corresponding to the second radio resource block comprises: configuration information of the second radio resource block comprises a maximum code rate of the second radio resource block, and the second-type reference value is a maximum code rate of the second radio resource block.

In one embodiment, the meaning of the phrase of a second-type reference value corresponding to the second radio resource block comprises: a number of RE(s) comprised in the second radio resource block is used to determine the second-type reference value.

In one embodiment, the second-type reference value is equal to a maximum code rate of the second radio resource block.

In one embodiment, the second-type reference value is less than a maximum code rate of the second radio resource block.

In one embodiment, the maximum code rate of the second radio resource block is configured by a higher-layer signaling.

In one embodiment, the maximum code rate of the second radio resource block is configured by an RRC signaling.

In one embodiment, the maximum code rate of the second radio resource block is configured by a MAC CE signaling.

In one embodiment, the maximum code rate of the second radio resource block is determined by a format of the second radio resource block.

In one embodiment, the maximum code rate of the second radio resource block is maxCodeRate, and for the specific meaning of the maxCodeRate, refer to section 9.2 in 3GPP TS38.213.

In one embodiment, a format of the second radio resource block is one of PUCCH format 0, PUCCH format 1, PUCCH format 2, PUCCH format 3, or PUCCH format 4.

In one embodiment, a format of the second radio resource block is one of PUCCH format 2, PUCCH format 3, or PUCCH format 4.

In one embodiment, for specific meanings of the PUCCH format 0, PUCCH format 1, PUCCH format 2, PUCCH format 3 and PUCCH format 4, refer to section 9.2 in 3GPP TS38.213.

In one embodiment, a value acquired by dividing the second-type reference value by the first-type reference value is used to determine the first offset.

In one embodiment, the first offset is equal to a value acquired by dividing the second-type reference value by the first-type reference value.

In one embodiment, the first offset is not less than a value acquired by dividing the second-type reference value by the first-type reference value.

In one embodiment, the first-type reference value and the second-type reference value are used together to determine the first offset from the first offset set.

In one embodiment, a value acquired by dividing the second-type reference value by the first-type reference value is used to determine the first offset from the first offset set.

In one embodiment, the first offset is a minimum offset in the first offset set not less than a value acquired by dividing the second-type reference value by the first-type reference value.

In one embodiment, the first offset is an offset closest to a value acquired by dividing the second-type reference value by the first-type reference value in the first offset set.

In one embodiment, a reference value is a value acquired by dividing the second-type reference value by the first-type reference value, and the first offset is an offset with a smallest absolute value of a difference value with the reference value in the first offset set.

Embodiment 9A

Figure 9A:
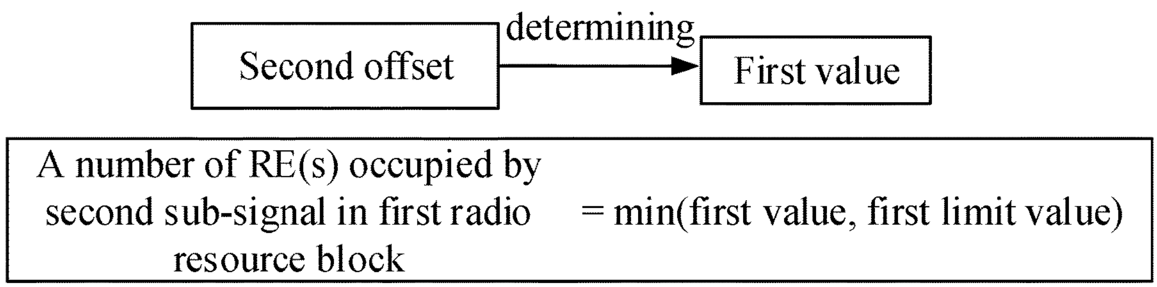
FIG. 9A illustrates a schematic diagram of a number of RE(s) occupied by a second sub-signal in a first radio resource block according to one embodiment of the present application.

Embodiment 9A illustrates a schematic diagram of a number of RE(s) occupied by a second sub-signal in a first radio resource block, as shown in FIG. 9A.

In embodiment 9A, the number of RE(s) occupied by the second sub-signal in the first radio resource block is equal to a minimum value of a first value and a first limit value, and the second offset in the present application is used to determine the first value.

In one embodiment, the first value is a positive integer.

In one embodiment, the first limit value is a positive integer.

In one embodiment, the first limit value is $$\left\lceil \alpha \sum_{l=l_0}^{N_{symb,all}^{PUSCH}-1} M_{sc}^{UCI}(l) \right\rceil,$$

where the α is a higher-layer parameter scaling, the $l_0$ is an index of a first multicarrier symbol not comprising a DMRS occupied by a PUSCH, the $$N_{symb,all}^{PUSCH}$$

is a number of multicarrier symbol(s) occupied by a PUSCH, the $$M_{sc}^{UCI}(l)$$

is a number of RE(s) that can be occupied by UCI on an l-th multicarrier symbol. The first signal in the present application is transmitted on the PUSCH. For the specific meanings of the $$\left\lceil \alpha \sum_{l=l_0}^{N_{symb,all}^{PUSCH}-1} M_{sc}^{UCI}(l) \right\rceil,$$

the α, the $l_0$, the $$N_{symb,all}^{PUSCH}$$

and the $$M_{sc}^{UCI}(l),$$

refer to section 6.3.2.4 in 3GPP TS38.212.

In one embodiment, the first limit value is $$\left\lceil \alpha \sum_{l=0}^{N_{symb,all}^{PUSCH}-1} M_{sc}^{UCI}(l) \right\rceil - Q'_{ACK},$$

and the $Q'_{ACK}$ is a number of RE(s) occupied by a HARQ-ACK. For the specific meanings of the $$\left\lceil \alpha \sum_{l=0}^{N_{symb,all}^{PUSCH}-1} M_{sc}^{UCI}(l) \right\rceil - Q'_{ACK},$$

the α, the $$N_{symb,all}^{PUSCH},$$

the $$M_{sc}^{UCI}(l)$$

and the $Q'_{ACK}$, refer to section 6.3.2.4 in 3GPP TS38.212.

In one embodiment, the first limit value is $$\sum_{l=0}^{N_{symb,all}^{PUSCH}-1} M_{sc}^{UCI}(l) - Q'_{ACK}.$$

For specific meanings of the $$\left\lceil \sum_{l=0}^{N_{symb,all}^{PUSCH}-1} M_{sc}^{UCI}(l) \right\rceil - Q'_{ACK},$$

the $$N_{symb,all}^{PUSCH},$$

the $$M_{sc}^{UCI}(l)$$

and the $Q'_{ACK}$, refer to section 6.3.2.4 in 3GPP TS38.212.

In one embodiment, the first limit value is $$\left\lceil \alpha \sum_{l=0}^{N_{symb,all}^{PUSCH}-1} M_{sc}^{UCI}(l) \right\rceil - Q'_{ACK} - Q'_{CSI-1},$$

and the $Q'_{CSI-1}$ is a number of RE(s) occupied by CSI part 1. For specific meanings of the $$\left\lceil \alpha \sum_{l=0}^{N_{symb,all}^{PUSCH}-1} M_{sc}^{UCI}(l) \right\rceil - Q'_{ACK} - Q'_{CSI-1},$$

the α, the $$N_{symb,all}^{PUSCH},$$

the $$M_{sc}^{UCI}(l),$$

the $Q'_{ACK}$ and the $Q'_{CSI-1}$, refer to section 6.3.2.4 in 3GPP TS38.212.

In one embodiment, the first limit value is $$M_{sc}^{PUSCH} \cdot N_{symb}^{PUSCH},$$

the $$M_{sc}^{PUSCH}$$

is a bandwidth configured by a latest AUL activation DCI, and the $$N_{symb}^{PUSCH}$$

is a number of multicarrier symbol(s) allocated to a PUSCH. The first signal in the present application is transmitted on the PUSCH. For the specific meanings of the $$M_{sc}^{PUSCH}$$

and the $$N_{symb}^{PUSCH},$$

refer to section 5.2.2 in 3GPP TS36.212.

In one embodiment, the first value is acquired after a product of a first-type value and a number of bit(s) comprised in the second bit block rounded up to an integer, the first-type value is equal to a product of a first-type reference value and the second offset, and the first-type reference value is related to both a number of RE(s) comprised in the first radio resource block and a number of bit(s) comprised in the first bit block.

In one subembodiment of the above embodiment, the first-type value is a positive real number.

In one subembodiment of the above embodiment, the first value is a minimum positive integer not less than the first-type value.

In one subembodiment of the above embodiment, the first value is a minimum positive integer that is not less than a product of the first-type value and a number of bit(s) comprised in the second bit block.

In one subembodiment of the above embodiment, the first-type reference value is a positive real number.

In one subembodiment of the above embodiment, the first-type reference value is equal to $$\frac{\sum_{l=0}^{N_{symb,all}^{PUSCH}-1} M_{sc}^{UCI}(l)}{\sum_{r=0}^{C_{UL-SCH}-1} K_r},$$

the $C_{UL-SCH}$ is a number of code block(s) comprised in a PUSCH, the $K_r$ is a number of bit(s) comprised in an r-th code block, the $$N_{symb,all}^{PUSCH}$$

is a number of multicarrier symbol(s) occupied by a PUSCH, the $$M_{sc}^{UCI}$$

is a number of RE(s) that can be occupied by UCI on an l-th multicarrier symbol. The first signal in the present application is transmitted on the PUSCH. For the specific meanings of the $$\frac{\sum_{l=0}^{N_{symb,all}^{PUSCH}-1} M_{sc}^{UCI}(l)}{\sum_{r=0}^{C_{UL-SCH}-1} K_r},$$

the $C_{UL-SCH}$, the $K_r$ the $$N_{symb,all}^{PUSCH}$$

and the $$M_{sc}^{UCI}(l),$$

refer to section 6.3.2.4 in 3GPP TS38.212.

In one subembodiment of the above embodiment, the first-type reference value is equal to $$\frac{1}{R \cdot Q_m},$$

the R is a code rate of a PUSCH, and the $Q_m$ is a modulation order of a PUSCH. The first signal in the present application is transmitted on the PUSCH. For the specific meanings of the $$\frac{1}{R \cdot Q_m},$$

the R and the $Q_m$, refer to section 6.3.2.4 in 3GPP TS38.212.

In one subembodiment of the above embodiment, the first-type reference value is equal to $$\frac{M_{sc}^{PUSCH-initial(x)} N_{symb}^{PUSCH-initial(x)}}{\sum_{r=0}^{C^{(x)}-1} K_r^{(x)}},$$

the x is an index of a TB block corresponding to a largest $I_{MCS}$ in TB block(s) carried by a PUSCH, the $C^{(x)}$ is a number of code block(s) comprised in a TB block indexed as x, the $$K_r^{(x)}$$

is a number of bit(s) comprised in an r-th code block of a TB block indexed as x, the $$M_{sc}^{PUSCH-initial}$$

is a number of multicarrier symbol(s) occupied by a first transmission of a TB block indexed as x, the $$N_{symb}^{PUSCH-initial(x)}$$

is a bandwidth occupied by a first transmission of a TB block indexed as x. The first signal in the present application is transmitted on the PUSCH. For the specific meanings of the $$\frac{M_{sc}^{PUSCH-initial(x)} N_{symb}^{PUSCH-initial(x)}}{\sum_{r=0}^{C^{(x)}-1} K_r^{(x)}},$$

the x, the $C^{(x)}$, the $$K_r^{(x)},$$

the $$M_{sc}^{PUSCH-initial(x)}$$

and the $$N_{symb}^{PUSCH-initial(x)},$$

refer to section 5.2.2 in 3GPP TS36.212.

Embodiment 9B

Figure 9B:
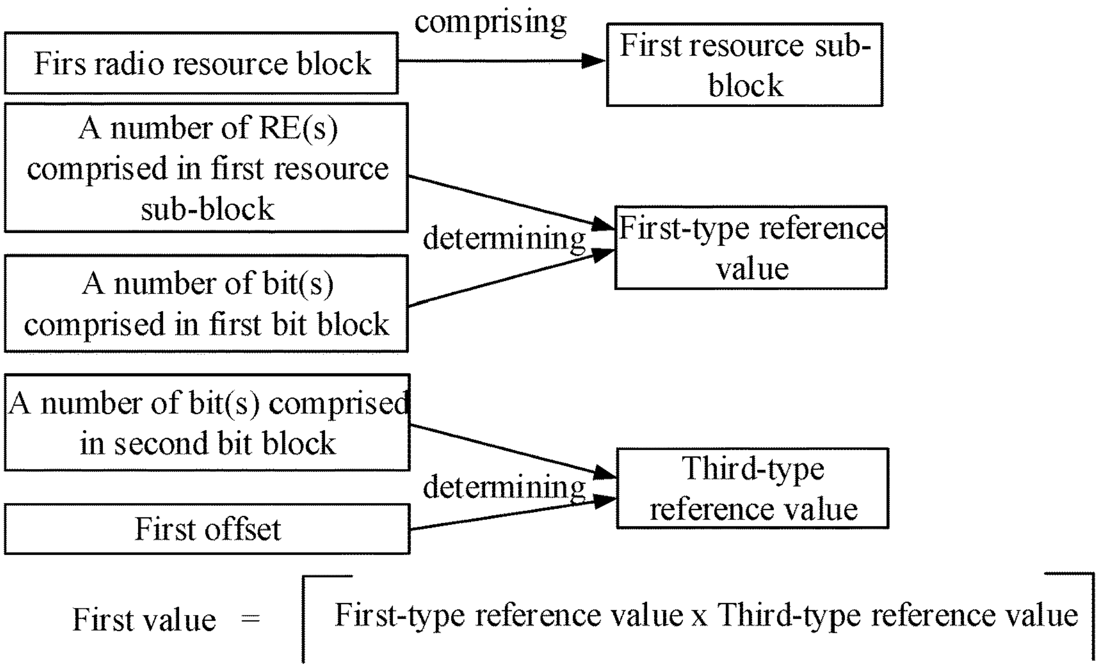
FIG. 9B illustrates a schematic diagram of a first value according to one embodiment of the present application.

Embodiment 9B illustrates a schematic diagram of a first value, as shown in FIG. 9B.

In embodiment 9B, the first value is a product of a first-type reference value and a third-type reference value rounded up to an integer, the first radio resource block in the present application comprises a first resource sub-block, a number of RE(s) comprised in the first resource sub-block and a number of bit(s) comprised in the first bit block in the present application are used to determine the first-type reference value, and a number of bit(s) comprised in the second bit block in the present application and the first offset are used together to determine the third-type reference value.

In one embodiment, the third-type parameter value is equal to a product of a number of bit(s) comprised in the second bit block and the first offset.

In one embodiment, the third-type parameter value is equal to a product of the target bit number and the first offset in the present application.

In one embodiment, the third-type reference value is a non-negative real number.

In one embodiment, the third-type reference value is a positive real number.

In one embodiment, the first value is a minimum positive integer that is not less than the product of the first-type reference value and the third-type reference value.

Embodiment 10A

Figure 10A:
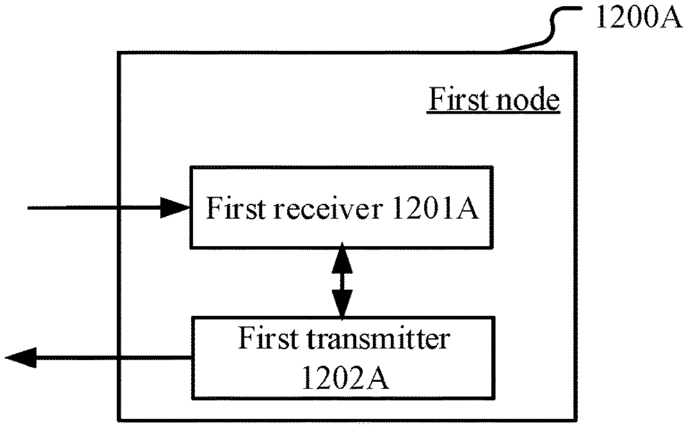
FIG. 10A illustrates a structure block diagram of a processor in a first node according to one embodiment of the present application.

Embodiment 10A illustrates a structure block diagram of a processor in a first node, as shown in FIG. 10A. In FIG. 10A, a processor 1200A in a first node comprises a first receiver 1201A and a first transmitter 1202A.

In one embodiment, the first node 1200A is a UE.

In one embodiment, the first node 1200A is a relay node.

In one embodiment, the first node 1200A is a vehicle-mounted communication device.

In one embodiment, the first node 1200A is a UE that supports V2X communications.

In one embodiment, the first node 1200A is a relay node that supports V2X communications.

In one embodiment, the first receiver 1201A comprises at least one of the antenna 452, the receiver 454, the multi-antenna receiving processor 458, the receiving processor 456, the controller/processor 459, the memory 460 or the data source 467 in FIG. 4 of the present application.

In one embodiment, the first receiver 1201A comprises at least the first five of the antenna 452, the receiver 454, the multi-antenna receiving processor 458, the receiving processor 456, the controller/processor 459, the memory 460 and the data source 467 in FIG. 4 of the present application.

In one embodiment, the first receiver 1201A comprises at least the first four of the antenna 452, the receiver 454, the multi-antenna receiving processor 458, the receiving processor 456, the controller/processor 459, the memory 460 and the data source 467 in FIG. 4 of the present application.

In one embodiment, the first receiver 1201A comprises at least the first three of the antenna 452, the receiver 454, the multi-antenna receiving processor 458, the receiving processor 456, the controller/processor 459, the memory 460 and the data source 467 in FIG. 4 of the present application.

In one embodiment, the first receiver 1201A comprises at least the first two of the antenna 452, the receiver 454, the multi-antenna receiving processor 458, the receiving processor 456, the controller/processor 459, the memory 460 and the data source 467 in FIG. 4 of the present application.

In one embodiment, the first transmitter 1202A comprises at least one of the antenna 452, the transmitter 454, the multi-antenna transmitting processor 457, the transmitting processor 468, the controller/processor 459, the memory 460, or the data source 467 in FIG. 4 of the present application.

In one embodiment, the first transmitter 1202A comprises at least first five the antenna 452, the transmitter 454, the multi-antenna transmitting processor 457, the transmitting processor 468, the controller/processor 459, the memory 460, and the data source 467 in FIG. 4 of the present application.

In one embodiment, the first transmitter 1202A comprises at least first four the antenna 452, the transmitter 454, the multi-antenna transmitting processor 457, the transmitting processor 468, the controller/processor 459, the memory 460, and the data source 467 in FIG. 4 of the present application.

In one embodiment, the first transmitter 1202A comprises at least first three the antenna 452, the transmitter 454, the multi-antenna transmitting processor 457, the transmitting processor 468, the controller/processor 459, the memory 460, and the data source 467 in FIG. 4 of the present application.

In one embodiment, the first transmitter 1202A comprises at least first two the antenna 452, the transmitter 454, the multi-antenna transmitting processor 457, the transmitting processor 468, the controller/processor 459, the memory 460, and the data source 467 in FIG. 4 of the present application.

The first receiver 1201A receives a first signaling; and receives a second signaling; and the first transmitter 1202A transmits a first signal in a first radio resource block;

In embodiment 10A, the first signaling is earlier than the second signaling in time domain; the first signaling is used to determine the first radio resource block and a size of a first bit block, the second signaling is used to determine a second bit block, a first signal comprises at least the second sub-signal in a first sub-signal and a second sub-signal, the first sub-signal carries the first bit block, and the second sub-signal carries the second bit block; both the first signaling and the second signaling comprises a first field, a value of the first field in the first signaling is used to indicate a first offset from a first offset set, a value of the first field in the second signaling is used to indicate a second offset from a second offset set, only the second offset in the first offset and the second offset is used to determine a number of RE(s) occupied by the second sub-signal in the first radio resource block; the first signaling is used to determine a first priority, the second signaling is used to determine a second priority, a signaling format of the first signaling is used to determine that the first offset set is related to the first priority, a signaling format of the second signaling is used to determine that the second offset set is unrelated to the second priority, and the signaling format of the first signaling is different from the signaling format of the second signaling.

In one embodiment, the first receiver 1201A also receives a second signal; herein, the second signaling is used to determine time-frequency resources occupied by the second signal, and the second bit block is related to the second signal.

In one embodiment, the first receiver 1201A also receives a first information block and a second information block; herein, the first information block is used to indicate the first reference offset set, the second information block is used to indicate the second reference offset set, a first reference priority corresponds to the first reference offset set, and a second reference priority corresponds to the second reference offset set; when the first priority is the first reference priority, the first offset set is the first reference offset set; when the first priority is the second reference priority, the first offset set is the second reference offset set.

In one embodiment, the first priority is used to determine the second offset set.

In one embodiment, the second offset set is unrelated to the first priority.

In one embodiment, the first receiver 1201A also receives a third information block; herein, the third information block is used to indicate the second offset set.

In one embodiment, the number of RE(s) occupied by the second sub-signal in the first radio resource block is equal to a minimum value of a first value and a first limit value, and the second offset is used to determine the first value.

Embodiment 10B

Figure 10B:
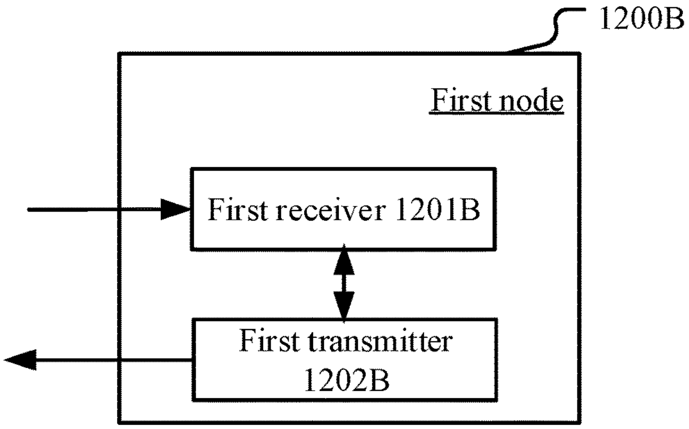
FIG. 10B illustrates a structure block diagram of a processor in a first node according to one embodiment of the present application.

Embodiment 10B illustrates a structure block diagram of a processor in a first node, as shown in FIG. 10B. In FIG. 10B, a processor 1200B of a first node comprises a first receiver 1201B and a first transmitter 1202B.

In one embodiment, the first node 1200B is a UE.

In one embodiment, the first node 1200B is a relay node.

In one embodiment, the first node 1200B is a vehicle-mounted communication device.

In one embodiment, the first node 1200B is a UE that supports V2X communications.

In one embodiment, the first node 1200 is a relay node that supports V2X communications.

In one embodiment, the first receiver 1201B comprises at least one of the antenna 452, the receiver 454, the multi-antenna receiving processor 458, the receiving processor 456, the controller/processor 459, the memory 460 or the data source 467 in FIG. 4 of the present application.

In one embodiment, the first receiver 1201B comprises at least the first five of the antenna 452, the receiver 454, the multi-antenna receiving processor 458, the receiving processor 456, the controller/processor 459, the memory 460 and the data source 467 in FIG. 4 of the present application.

In one embodiment, the first receiver 1201B comprises at least the first four of the antenna 452, the receiver 454, the multi-antenna receiving processor 458, the receiving processor 456, the controller/processor 459, the memory 460 and the data source 467 in FIG. 4 of the present application.

In one embodiment, the first receiver 1201B comprises at least the first three of the antenna 452, the receiver 454, the multi-antenna receiving processor 458, the receiving processor 456, the controller/processor 459, the memory 460 and the data source 467 in FIG. 4 of the present application.

In one embodiment, the first receiver 1201B comprises at least the first two of the antenna 452, the receiver 454, the multi-antenna receiving processor 458, the receiving processor 456, the controller/processor 459, the memory 460 and the data source 467 in FIG. 4 of the present application.

In one embodiment, the first transmitter 1202B comprises at least one of the antenna 452, the transmitter 454, the multi-antenna transmitting processor 457, the transmitting processor 468, the controller/processor 459, the memory 460, or the data source 467 in FIG. 4 of the present application.

In one embodiment, the first transmitter 1202B comprises at least first five the antenna 452, the transmitter 454, the multi-antenna transmitting processor 457, the transmitting processor 468, the controller/processor 459, the memory 460, and the data source 467 in FIG. 4 of the present application.

In one embodiment, the first transmitter 1202B comprises at least first four the antenna 452, the transmitter 454, the multi-antenna transmitting processor 457, the transmitting processor 468, the controller/processor 459, the memory 460, and the data source 467 in FIG. 4 of the present application.

In one embodiment, the first transmitter 1202B comprises at least first three the antenna 452, the transmitter 454, the multi-antenna transmitting processor 457, the transmitting processor 468, the controller/processor 459, the memory 460, and the data source 467 in FIG. 4 of the present application.

In one embodiment, the first transmitter 1202B comprises at least first two the antenna 452, the transmitter 454, the multi-antenna transmitting processor 457, the transmitting processor 468, the controller/processor 459, the memory 460, and the data source 467 in FIG. 4 of the present application.

The first receiver 1201B, receives a first signaling, the first signaling is used to indicate a first radio resource block; receives a second signaling, the second signaling is used to indicate a second radio resource block;

the first transmitter 1202B, transmits a first signal in the first radio resource block, or, transmits a second signal in the second radio resource block;

In embodiment 10B, the first signaling is used to determine a size of a first bit block, the second signaling is used to determine a second bit block, the first signal comprises at least the second sub-signal of a first sub-signal and a second sub-signal, the first sub-signal carries the first bit block, the second sub-signal carries the second bit block, and the second signal carries the second bit block; when a first value is less than a first limit value, the first signal is transmitted in the first radio resource block; when the first value is greater than the first limit value, the second signal is transmitted in the second radio resource block; a number of bit(s) comprised in the second bit block and a first offset are used together to determine the first value, and the first limit value is not greater than a number of RE(s) comprised in the first radio resource block; the first value is a positive integer, the first limit value is a positive integer, and the first offset is a positive integer.

In one embodiment, the first signaling is used to determine a first priority, the second signaling is used to determine a second priority, the second priority being higher than the first priority.

In one embodiment, the first radio resource block comprises a second resource sub-block, a product of a number of RE(s) comprised in the second resource sub-block and a second offset is used to determine the first limit value, and the second offset is a positive integer not greater than 1.

In one embodiment, the first receiver 1201B also receives a first information block; herein, the first information block is used to indicate the second offset.

In one embodiment, the first radio resource block comprises a first resource sub-block, and a number of RE(s) comprised in the first resource sub-block and a number of bit(s) comprised in the first bit block are used to determine a first-type reference value; a second-type reference value corresponds to the second radio resource block, and the second-type reference value is not greater than a maximum code rate of the second radio resource block; the first reference value and the second-type reference value are used together to determine the first offset.

In one embodiment, the first receiver 1201B also receives a second information block; herein, the second information block is used to indicate a first offset set, the first offset is an offset in the first offset set; the first offset set comprises a positive integer number of offset(s), and any offset in the first offset set is a non-negative real number.

In one embodiment, the first receiver 1201B receives a third signal; herein, the second signaling is used to determine time-frequency resources occupied by the third signal, and the second bit block is generated for the third signal.

Embodiment 11A

Figure 11A:
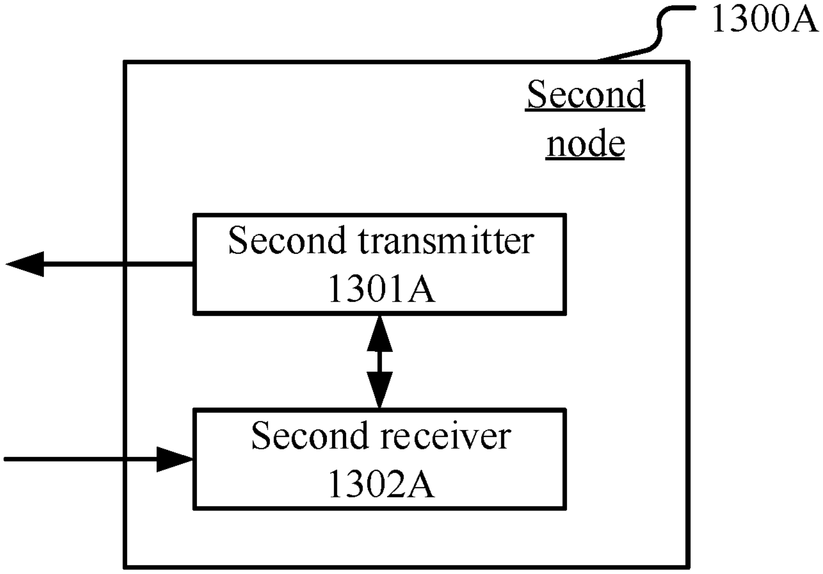
FIG. 11A illustrates a structure block diagram of a processor in a second node according to one embodiment of the present application.

Embodiment 11A illustrates a structure block diagram of a processor in a second node, as shown in FIG. 11A. In FIG. 11A, a processor 1300A of a second node comprises a second transmitter 1301A and a second receiver 1302A.

In one embodiment, the second node 1300A is a UE.

In one embodiment, the second node 1300A is a base station.

In one embodiment, the second node 1300A is a relay node.

In one embodiment, the second transmitter 1301A comprises at least one of the antenna 420, the transmitter 418, the multi-antenna transmitting processor 471, the transmitting processor 416, the controller/processor 475 or the memory 476 in FIG. 4 of the present application.

In one embodiment, the second transmitter 1301A comprises at least the first five of the antenna 420, the transmitter 418, the multi-antenna transmitting processor 471, the transmitting processor 416, the controller/processor 475 and the memory 476 in FIG. 4 of the present application.

In one embodiment, the second transmitter 1301A comprises at least the first four of the antenna 420, the transmitter 418, the multi-antenna transmitting processor 471, the transmitting processor 416, the controller/processor 475 and the memory 476 in FIG. 4 of the present application.

In one embodiment, the second transmitter 1301A comprises at least the first three of the antenna 420, the transmitter 418, the multi-antenna transmitting processor 471, the transmitting processor 416, the controller/processor 475 and the memory 476 in FIG. 4 of the present application.

In one embodiment, the second transmitter 1301A comprises at least the first two of the antenna 420, the transmitter 418, the multi-antenna transmitting processor 471, the transmitting processor 416, the controller/processor 475 and the memory 476 in FIG. 4 of the present application.

In one embodiment, the second receiver 1302A comprises at least one of the antenna 420, the receiver 418, the multi-antenna receiving processor 472, the receiving processor 470, the controller/processor 475 or the memory 476 in FIG. 4 of the present application.

In one embodiment, the second receiver 1302A comprises at least first five of the antenna 420, the receiver 418, the multi-antenna receiving processor 472, the receiving processor 470, the controller/processor 475 and the memory 476 in FIG. 4 of the present application.

In one embodiment, the second receiver 1302A comprises at least first four of the antenna 420, the receiver 418, the multi-antenna receiving processor 472, the receiving processor 470, the controller/processor 475 and the memory 476 in FIG. 4 of the present application.

In one embodiment, the second receiver 1302A comprises at least first three of the antenna 420, the receiver 418, the multi-antenna receiving processor 472, the receiving processor 470, the controller/processor 475 and the memory 476 in FIG. 4 of the present application.

In one embodiment, the second receiver 1302A comprises at least first two of the antenna 420, the receiver 418, the multi-antenna receiving processor 472, the receiving processor 470, the controller/processor 475 and the memory 476 in FIG. 4 of the present application.

The second transmitter 1301A transmits a first signaling; transmits a second signaling;

the second receiver 1302A receives a first signal in a first radio resource block;

In embodiment 11A, the first signaling is earlier than the second signaling in time domain; the first signaling is used to determine the first radio resource block and a size of a first bit block, the second signaling is used to determine a second bit block, a first signal comprises at least the second sub-signal in a first sub-signal and a second sub-signal, the first sub-signal carries the first bit block, and the second sub-signal carries the second bit block; both the first signaling and the second signaling comprises a first field, a value of the first field in the first signaling is used to indicate a first offset from a first offset set, a value of the first field in the second signaling is used to indicate a second offset from a second offset set, only the second offset in the first offset and the second offset is used to determine a number of RE(s) occupied by the second sub-signal in the first radio resource block; the first signaling is used to determine a first priority, the second signaling is used to determine a second priority, a signaling format of the first signaling is used to determine that the first offset set is related to the first priority, a signaling format of the second signaling is used to determine that the second offset set is unrelated to the second priority, and the signaling format of the first signaling is different from the signaling format of the second signaling.

In one embodiment, the second transmitter 1301A also transmits a second signal; herein, the second signaling is used to determine time-frequency resources occupied by the second signal, and the second bit block is related to the second signal.

In one embodiment, the second transmitter 1301A also transmits a first information block and a second information block; herein, the first information block is used to indicate the first reference offset set, the second information block is used to indicate the second reference offset set, a first reference priority corresponds to the first reference offset set, and a second reference priority corresponds to the second reference offset set; when the first priority is the first reference priority, the first offset set is the first reference offset set; when the first priority is the second reference priority, the first offset set is the second reference offset set.

In one embodiment, the first priority is used to determine the second offset set.

In one embodiment, the second offset set is unrelated to the first priority.

In one embodiment, the second transmitter 1301A also transmits a third information block; herein, the third information block is used to indicate the second offset set.

In one embodiment, the number of RE(s) occupied by the second sub-signal in the first radio resource block is equal to a minimum value of a first value and a first limit value, and the second offset is used to determine the first value.

Embodiment 11B

Figure 11B:
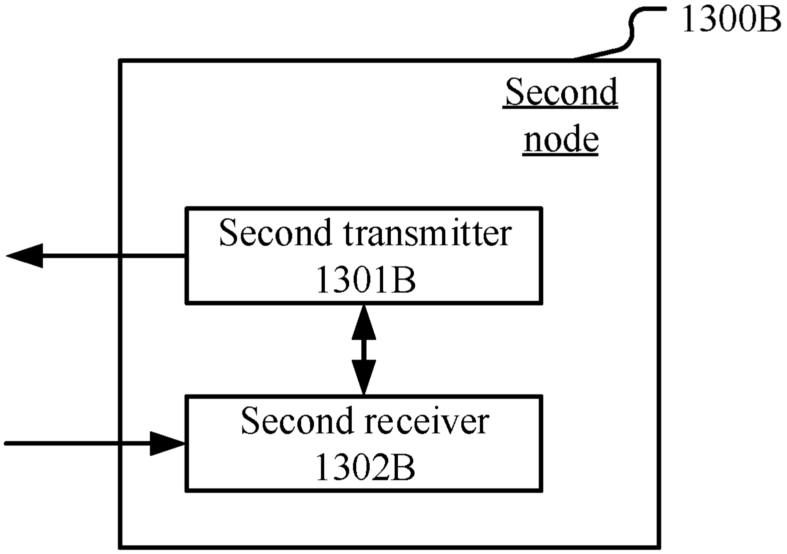
FIG. 11B illustrates a structure block diagram of a processor in second node according to one embodiment of the present application.

Embodiment 11B illustrates a structure block diagram of a processor in a second node, as shown in FIG. 11B. In FIG. 11B, a processor 1300B of a second node comprises a second transmitter 1301B and a second receiver 1302B.

In one embodiment, the second node 1300B is a UE.

In one embodiment, the second node 1300B is a base station.

In one embodiment, the second node 1300B is a relay node.

In one embodiment, the second transmitter 1301B comprises at least one of the antenna 420, the transmitter 418, the multi-antenna transmitting processor 471, the transmitting processor 416, the controller/processor 475 or the memory 476 in FIG. 4 of the present application.

In one embodiment, the second transmitter 1301B comprises at least the first five of the antenna 420, the transmitter 418, the multi-antenna transmitting processor 471, the transmitting processor 416, the controller/processor 475 and the memory 476 in FIG. 4 of the present application.

In one embodiment, the second transmitter 1301B comprises at least the first four of the antenna 420, the transmitter 418, the multi-antenna transmitting processor 471, the transmitting processor 416, the controller/processor 475 and the memory 476 in FIG. 4 of the present application.

In one embodiment, the second transmitter 1301B comprises at least the first three of the antenna 420, the transmitter 418, the multi-antenna transmitting processor 471, the transmitting processor 416, the controller/processor 475 and the memory 476 in FIG. 4 of the present application.

In one embodiment, the second transmitter 1301B comprises at least the first two of the antenna 420, the transmitter 418, the multi-antenna transmitting processor 471, the transmitting processor 416, the controller/processor 475 and the memory 476 in FIG. 4 of the present application.

In one embodiment, the second receiver 1302B comprises at least one of the antenna 420, the receiver 418, the multi-antenna receiving processor 472, the receiving processor 470, the controller/processor 475 or the memory 476 in FIG. 4 of the present application.

In one embodiment, the second receiver 1302B comprises at least first five of the antenna 420, the receiver 418, the multi-antenna receiving processor 472, the receiving processor 470, the controller/processor 475 and the memory 476 in FIG. 4 of the present application.

In one embodiment, the second receiver 1302B comprises at least first four of the antenna 420, the receiver 418, the multi-antenna receiving processor 472, the receiving processor 470, the controller/processor 475 and the memory 476 in FIG. 4 of the present application.

In one embodiment, the second receiver 1302B comprises at least first three of the antenna 420, the receiver 418, the multi-antenna receiving processor 472, the receiving processor 470, the controller/processor 475 and the memory 476 in FIG. 4 of the present application.

In one embodiment, the second receiver 1302B comprises at least first two of the antenna 420, the receiver 418, the multi-antenna receiving processor 472, the receiving processor 470, the controller/processor 475 and the memory 476 in FIG. 4 of the present application.

The second transmitter 1301B transmits a first signaling, the first signaling is used to indicate a first radio resource block; transmits a second signaling, the second signaling is used to indicate a second radio resource block; and the second receiver 1302B receives a first signal in the first radio resource block, or, receives a second signal in the second radio resource block;

In embodiment 11B, the first signaling is used to determine a size of a first bit block, the second signaling is used to determine a second bit block, the first signal comprises at least the second sub-signal of a first sub-signal and a second sub-signal, the first sub-signal carries the first bit block, the second sub-signal carries the second bit block, and the second signal carries the second bit block; when a first value is less than a first limit value, the first signal is transmitted in the first radio resource block; when the first value is greater than the first limit value, the second signal is transmitted in the second radio resource block; a number of bit(s) comprised in the second bit block and a first offset are used together to determine the first value, and the first limit value is not greater than a number of RE(s) comprised in the first radio resource block; the first value is a positive integer, the first limit value is a positive integer, and the first offset is a positive integer.

In one embodiment, the first signaling is used to determine a first priority, the second signaling is used to determine a second priority, the second priority being higher than the first priority.

In one embodiment, the first radio resource block comprises a second resource sub-block, a product of a number of RE(s) comprised in the second resource sub-block and a second offset is used to determine the first limit value, and the second offset is a positive integer not greater than 1.

In one embodiment, the second transmitter 1301B also transmits a first information block; herein, the first information block is used to indicate the second offset.

In one embodiment, the first radio resource block comprises a first resource sub-block, and a number of RE(s) comprised in the first resource sub-block and a number of bit(s) comprised in the first bit block are used to determine a first-type reference value; a second-type reference value corresponds to the second radio resource block, and the second-type reference value is not greater than a maximum code rate of the second radio resource block; the first reference value and the second-type reference value are used together to determine the first offset.

In one embodiment, the second transmitter 1301B also transmits a second information block; herein, the second information block is used to indicate a first offset set, the first offset is an offset in the first offset set; the first offset set comprises a positive integer number of offset(s), and any offset in the first offset set is a non-negative real number.

In one embodiment, the second transmitter 1301B also transmits a third signal; herein, the second signaling is used to determine time-frequency resources occupied by the third signal, and the second bit block is generated for the third signal.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The first node in the present application includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts and other wireless communication devices. The second node in the present application includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts and other wireless communication devices. The UE or terminal in the present application includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts, etc. The base station or network side equipment in the present application includes but is not limited to macro-cellular base stations, micro-cellular base stations, home base stations, relay base station, eNB, gNB, Transmitter Receiver Point (TRP), GNSS, relay satellites, satellite base stations, space base stations and other radio communication equipment.

The above are merely the preferred embodiments of the present application and are not intended to limit the scope of protection of the present application. Any modification, equivalent substitute and improvement made within the spirit and principle of the present application are intended to be included within the scope of protection of the present application.

What is claimed is:

1. A user equipment (UE) for wireless communications, the UE comprising:

a receiver configured to:

receive a first signaling used to determine a radio resource block and a first priority, wherein the first signaling includes a first offset value that indicates a first offset of a first offset set, and a format of the first signaling is used to determine that the first offset set is related to the first priority; and receive, after the first signaling, a second signaling used to determine a bit block and a second priority, wherein the second signaling includes a second offset value that indicates a second offset in a second offset set, a format of the second signaling, that is different than the format of the first signaling, is used to determine that the second offset set is unrelated to the second priority, and the first priority is used to determine the second offset set; and a transmitter configured to transmit a first signal in the radio resource block, wherein the first signal includes a sub-signal that carries the bit block;

wherein only the second offset, of the first offset and the second offset, is used to determine a number of resource elements (REs) in the radio resource block occupied by the sub-signal, and wherein the number of REs in the radio resource block occupied by the sub-signal is equal to a minimum value of a first value and a first limit value, the second offset is used to determine the first value, and the first limit value is determined based on a product of the second offset and a number of resource elements comprised in a second resource sub-block.

2. The UE of claim 1, wherein the second signaling is associated with a second identifier, the second identifier belongs to one of a plurality of identifier sets, and the second offset set is determined based on which identifier set includes the second identifier.

3. The UE of claim 1, wherein the receiver is further configured to receive an indication of a first reference offset set and an indication of a second reference offset set;

wherein a first reference priority corresponds to the first reference offset set, and a second reference priority corresponds to the second reference offset set; on a condition that the first priority is the first reference priority, the first offset set is the first reference offset set; and on a condition that the first priority is the second reference priority, the first offset set is the second reference offset set.

4. The UE of claim 1, wherein the first priority is used to determine the second offset set.

5. The UE of claim 1, wherein the first signaling is associated with a first identifier and the second signaling is associated with a second identifier, and wherein the second offset set is determined based on the second identifier.

6. A base station for wireless communications, the base station comprising:

a transmitter configured to:

transmit a first signaling used to determine a radio resource block and a first priority, wherein the first signaling includes a first offset value that indicates a first offset of a first offset set, and a format of the first signaling is used to determine that the first offset set is related to the first priority; and transmit, after the first signaling, a second signaling used to determine a bit block and a second priority, wherein the second signaling includes a second offset value that indicates a second offset in a second offset set, a format of the second signaling, that is different than the format of the first signaling, is used to determine that the second offset set is unrelated to the second priority, and the first priority is used to determine the second offset set;

and a receiver configured to receive a first signal in the radio resource block, wherein the first signal includes a sub-signal that carries the bit block;

wherein only the second offset, of the first offset and the second offset, is used to determine a number of resource elements (REs) in the radio resource block occupied by the sub-signal, and wherein the number of REs in the radio resource block occupied by the sub-signal is equal to a minimum value of a first value and a first limit value, the second offset is used to determine the first value, and the first limit value is determined based on a product of the second offset and a number of resource elements comprised in a second resource sub-block.

7. The base station of claim 6, wherein the second signaling is associated with a second identifier, the second identifier belongs to one of a plurality of identifier sets, and the second offset set is determined based on which identifier set includes the second identifier.

8. The base station of claim 6, wherein the transmitter is further configured to transmit an indication of a first reference offset set and an indication of a second reference offset set;

wherein a first reference priority corresponds to the first reference offset set, and a second reference priority corresponds to the second reference offset set; on a condition that the first priority is the first reference priority, the first offset set is the first reference offset set; and on a condition that the first priority is the second reference priority, the first offset set is the second reference offset set.

9. The base station of claim 6, wherein the first priority is used to determine the second offset set.

10. The base station of claim 6, wherein the first signaling is associated with a first identifier and the second signaling is associated with a second identifier, and wherein the second offset set is determined based on the second identifier.

11. A method performed by a user equipment (UE), the method comprising:

receiving a first signaling used to determine a radio resource block and a first priority, the first signaling includes a first offset value that indicates a first offset of a first offset set, and a format of the first signaling is used to determine that the first offset set is related to the first priority;

receiving, after the first signaling, a second signaling used to determine a bit block and a second priority, wherein the second signaling includes a second offset value that indicates a second offset in a second offset set, a format of the second signaling, that is different than the format of the first signaling, is used to determine that the second offset set is unrelated to the second priority, and the first priority is used to determine the second offset set; and transmitting a first signal in the radio resource block, wherein the first signal includes a sub-signal that carries the bit block;

wherein only the second offset, of the first offset and the second offset, is used to determine a number of resource elements (REs) in the radio resource block occupied by the sub-signal, and wherein the number of REs in the radio resource block occupied by the sub-signal is equal to a minimum value of a first value and a first limit value, the second offset is used to determine the first value, and the first limit value is determined based on a product of the second offset and a number of resource elements comprised in a second resource sub-block.

12. The method of claim 11, wherein the second signaling is associated with a second identifier, the second identifier belongs to one of a plurality of identifier sets, and the second offset set is determined based on which identifier set includes the second identifier.

13. The method of claim 11, further comprising:

receiving an indication of a first reference offset set and an indication of a second reference offset set;

wherein a first reference priority corresponds to the first reference offset set, and a second reference priority corresponds to the second reference offset set; on a condition that the first priority is the first reference priority, the first offset set is the first reference offset set; and on a condition that the first priority is the second reference priority, the first offset set is the second reference offset set.

14. The method of claim 11, wherein the first priority is used to determine the second offset set.

15. The method of claim 11, wherein the first signaling is associated with a first identifier and the second signaling is associated with a second identifier, and wherein the second offset set is determined based on the second identifier.

16. A method performed by a base station, the method comprising:

transmitting a first signaling used to determine a radio resource block and a first priority, wherein the first signaling includes a first offset value that indicates a first offset of a first offset set, and a format of the first signaling is used to determine that the first offset set is related to the first priority;

transmitting, after the first signaling, a second signaling used to determine a bit block and a second priority, wherein the second signaling includes a second offset value that indicates a second offset in a second offset set, a format of the second signaling, that is different than the format of the first signaling, is used to determine that the second offset set is unrelated to the second priority, and the first priority is used to determine the second offset set; and receiving a first signal in the radio resource block, wherein the first signal includes a sub-signal that carries the bit block;

wherein only the second offset, of the first offset and the second offset, is used to determine a number of resource elements (REs) in the radio resource block occupied by the sub-signal, and wherein the number of REs in the radio resource block occupied by the sub-signal is equal to a minimum value of a first value and a first limit value, the second offset is used to determine the first value, and the first limit value is determined based on a product of the second offset and a number of resource elements comprised in a second resource sub-block.

17. The method of claim 16, wherein the second signaling is associated with a second identifier, the second identifier belongs to one of a plurality of identifier sets, and the second offset set is determined based on which identifier set includes the second identifier.

18. The method of claim 16, further comprising:

transmitting an indication of a first reference offset set and an indication of a second reference offset set;

wherein a first reference priority corresponds to the first reference offset set, and a second reference priority corresponds to the second reference offset set; on a condition that the first priority is the first reference priority, the first offset set is the first reference offset set; and on a condition that the first priority is the second reference priority, the first offset set is the second reference offset set.

19. The method of claim 16, wherein the first priority is used to determine the second offset set.

20. The method of claim 16, wherein the first signaling is associated with a first identifier and the second signaling is associated with a second identifier, and wherein the second offset set is determined based on the second identifier.

* * * * *